US005908707A

United States Patent [19]

Cabell et al.

[11] Patent Number: 5,908,707

[45] Date of Patent: Jun. 1, 1999

[54] CLEANING ARTICLES COMPRISING A HIGH INTERNAL PHASE INVERSE EMULSION AND A CARRIER WITH CONTROLLED ABSORBENCY

[75] Inventors: David William Cabell, Cincinnati; Larry Neil Mackey; Robert Stanley Ampulski, both of Fairfield; Paul Dennis Trokhan, Hamilton; John William Toussant; James Edwin Cartledge, Jr., both of West Chester; Nicholas James Nissing, Cincinnati, all of Ohio

[73] Assignee: The Procter & Gamble Company, Cincinnati, Ohio

[21] Appl. No.: 08/761,733

[22] Filed: Dec. 5, 1996

[51] Int. Cl.[6] .......... B32B 29/00

[52] U.S. Cl. .......... 428/537.5; 424/405; 424/414; 424/420; 510/152; 510/153; 510/468

[58] Field of Search .......... 510/152, 153, 510/468; 428/537.5; 424/405, 414, 420

[56] References Cited

U.S. PATENT DOCUMENTS

| | | | |
|---|---|---|---|
| 2,868,824 | 1/1959 | Haluska | 260/448.2 |
| 3,215,707 | 11/1965 | Rense | 260/326.3 |
| 3,231,587 | 1/1966 | Rense | 260/346.8 |
| 3,818,533 | 6/1974 | Scheuer | 15/104.93 |
| 3,819,530 | 6/1974 | Ratledge et al. | 252/311.5 |
| 3,847,637 | 11/1974 | Luszczak | 106/271 |
| 3,896,807 | 7/1975 | Buchalter | 128/261 |
| 3,919,149 | 11/1975 | Cushman et al. | 260/28.5 AV |
| 3,965,518 | 6/1976 | Muoio | 15/104.93 |
| 3,982,993 | 9/1976 | Fife | 162/158 |
| 4,043,829 | 8/1977 | Ratledge et al. | 106/271 |
| 4,082,887 | 4/1978 | Coates | 428/289 |
| 4,104,403 | 8/1978 | Barker et al. | 424/365 |
| 4,112,167 | 9/1978 | Dake et al. | 428/154 |
| 4,117,199 | 9/1978 | Gotoh et al. | 428/486 |
| 4,122,029 | 10/1978 | Gee et al. | 252/309 |
| 4,137,358 | 1/1979 | Hartz | 428/272 |
| 4,203,877 | 5/1980 | Baker | 260/18 |
| 4,246,423 | 1/1981 | Martin | 556/423 |
| 4,293,611 | 10/1981 | Martin | 428/266 |
| 4,339,276 | 7/1982 | Yokoyama et al. | 106/271 |
| 4,377,649 | 3/1983 | Sweeney et al. | 524/49 |
| 4,381,241 | 4/1983 | Romenesko et al. | 252/8.5 P |
| 4,385,049 | 5/1983 | Cuca | 424/167 |
| 4,421,656 | 12/1983 | Donatelli et al. | 252/8.5 P |
| 4,446,051 | 5/1984 | Berthod et al. | 252/309 |
| 4,468,254 | 8/1984 | Yokoyama et al. | 106/271 |
| 4,481,243 | 11/1984 | Allen | 428/154 |
| 4,513,051 | 4/1985 | Lavash | 428/212 |
| 4,514,345 | 4/1985 | Johnson et al. | 264/22 |
| 4,520,160 | 5/1985 | Brown | 524/765 |
| 4,606,913 | 8/1986 | Aronson et al. | 424/59 |
| 4,698,178 | 10/1987 | Hüttinger et al. | 252/309 |
| 4,708,753 | 11/1987 | Forsberg | 149/2 |
| 4,782,095 | 11/1988 | Gum | 514/937 |
| 4,801,447 | 1/1989 | Gum | 424/68 |
| 4,844,756 | 7/1989 | Forsberg | 149/2 |
| 4,853,474 | 8/1989 | Bahr et al. | 556/445 |
| 4,875,927 | 10/1989 | Tadros | 71/94 |
| 4,948,531 | 8/1990 | Fuggini et al. | 510/468 |
| 5,021,405 | 6/1991 | Klimisch | 514/63 |
| 5,047,175 | 9/1991 | Forsberg | 252/356 |
| 5,133,972 | 7/1992 | Ferrini et al. | 424/449 |
| 5,136,068 | 8/1992 | Bahr et al. | 556/445 |
| 5,162,378 | 11/1992 | Guthauser | 514/785 |
| 5,210,102 | 5/1993 | Klimisch | 514/784 |
| 5,245,025 | 9/1993 | Trokhan et al. | 536/56 |
| 5,247,044 | 9/1993 | Crivello et al. | 528/15 |
| 5,277,761 | 1/1994 | Van Phan et al. | 162/109 |
| 5,292,503 | 3/1994 | Raleigh et al. | 424/59 |
| 5,362,482 | 11/1994 | Yoneyama et al. | 424/69 |
| 5,378,455 | 1/1995 | Kealey et al. | 424/73 |
| 5,387,417 | 2/1995 | Rentsch | 424/401 |
| 5,470,551 | 11/1995 | Dubief et al. | 424/70.12 |
| 5,482,703 | 1/1996 | Pings | 424/70.12 |
| 5,503,715 | 4/1996 | Trokhan et al. | 162/296 |
| 5,525,345 | 6/1996 | Warner et al. | 424/402 |
| 5,534,326 | 7/1996 | Trokhan et al. | 428/131 |

FOREIGN PATENT DOCUMENTS

| | | |
|---|---|---|
| 1 132 908 | 10/1982 | Canada . |
| 0 110 678 A2 | 6/1984 | European Pat. Off. . |
| 0 259 034 A2 | 3/1988 | European Pat. Off. . |
| 0 365 160 | 4/1990 | European Pat. Off. . |
| 0 501 791 A3 | 9/1992 | European Pat. Off. . |
| 0 545 002 A1 | 6/1993 | European Pat. Off. . |
| 0 631 774 A1 | 1/1995 | European Pat. Off. . |
| 3341770 A1 | 5/1983 | Germany . |
| 155758 | 9/1981 | India . |
| 2/152920 | 6/1990 | Japan . |
| 3/168118 | 7/1991 | Japan . |
| 59144426 | 8/1994 | Japan . |
| WO 94/02120 | 2/1994 | WIPO . |

*Primary Examiner*—Melvyn I. Marquis
*Attorney, Agent, or Firm*—Carl J. Roof; E. Kelly Linman; Jacobus C. Rasser

[57] ABSTRACT

Wet-like cleaning wipes and similar articles are described. These wipes comprise a carrier that provides controlled fluid absorbency and an emulsion applied to the carrier. The emulsion comprises a continuous external lipid phase and a polar (e.g., water) internal phase. The emulsion is sufficiently brittle that it ruptures when subjected to low shear pressures during use to release the dispersed polar phase. The carrier allows the released internal phase to initially reach and remain on the surface being cleaned, but then absorbs the material at the end of the wiping process.

37 Claims, 4 Drawing Sheets

CLEANING ARTICLES COMPRISING A HIGH INTERNAL PHASE INVERSE EMULSION AND A CARRIER WITH CONTROLLED ABSORBENCY

TECHNICAL FIELD

This application relates to articles that are useful as wet-like cleaning wipes. The application particularly relates to wet-like cleaning wipes made from a carrier treated with a high internal phase inverse emulsion. The carrier exhibits delayed absorbency of water and aqueous-based cleaning solutions to enhance cleaning performance. The wipes are useful in various cleaning applications, and in particular those for hard surface cleaning.

BACKGROUND OF THE INVENTION

Nonwoven webs or sheets such as those made of paper find extensive use in modern society in the context of household cleaning activity. Paper towels, for example, are a staple item of commerce which have long been used to wipe up liquid spills and to remove stains and/or soil from hard surfaces such as window glass, countertops, sinks, porcelain and metal fixtures, walls and the like, and from other surfaces such as carpeting or furniture.

Paper towels products which are especially useful for household cleaning have attributes which include relatively low density, high bulk, acceptable softness, high absorbency for both aqueous and nonaqueous liquids and acceptable strength and integrity, especially when wet. Prior art towel products having such attributes, and processes for their preparation, have been disclosed, for example, in Ayers, U.S. Pat. No. 3,905,863, issued Sep. 16, 1975; Ayers, U.S. Pat. No. 3,974,025, issued Aug. 10, 1976; Trokhan, U.S. Pat. No. 4,191,609, issued Mar. 4, 1980; Wells and Hensler, U.S. Pat. No. 4,440,597, issued Apr. 3, 1984; Trokhan, U.S. Pat. No. 4,529,840, issued Jul. 16, 1985; and Trokhan, U.S. Pat. No. 4,637,859, issued Jan. 20, 1987. Paper towels, such as those of the types described in the foregoing patents, are especially useful for absorbing and wiping up liquid spills from both hard surfaces and other surfaces such as furniture and carpets. Paper towel products, however, are also frequently used, generally in combination with liquid cleaning solutions or solvents, to remove soil or stains from surfaces to which such soil or stains may be especially securely affixed. Such soil or stains, for example, may include food material on stove, oven, or cooking utensil surfaces, soap scum found in bathtubs and sinks, food and beverage stains on kitchen counters, ink or crayon markings on walls and furniture, and the like. These prior art materials typically require the consumer to clean soils and stains using a separate cleaning solution and wiping article, which involves a level of inconvenience.

To address this issue of convenience, pre-wetted wiping articles have been developed, particularly in the area of baby wipes. These pre-wetted wipes are typically kept in a dispenser and are typically soaked in a reservoir of a moistening solution. There is often a lack of consistency in terms of the moisture content of each of the wipes, and the wipes feel cold to the touch. Also, because the main purpose of such wipes is to clean, these wipes generally exhibit relatively poor post-cleaning absorbency.

Co-pending U.S. patent application Ser. No. 08/336,456 (hereafter "'456 application"), filed Nov. 9, 1994 by L. Mackey et al., abandoned, discloses and claims wet-like cleansing wipes that are especially useful in removing perianal soils. These cleansing wipes comprise a substrate material (e.g., a nonwoven) that is treated with a water-in-lipid emulsion. These wipes have a number of significant advantages over prior cleaning products, especially when in the form of wet-like cleansing wipes used to remove perianal soils. These articles release significant quantities of water during use for comfortable, more effective cleaning. The continuous lipid phase of the emulsion is sufficiently brittle so as to be easily disrupted by low shear contact (e.g., during the wiping of the skin) to readily release this internal water phase, but sufficiently tough at elevated temperatures where the lipid is melted to avoid premature release of the water phase during the rigors of processing. The continuous lipid phase of these articles is also sufficiently stable during storage so as to prevent significant evaporation of the internal water phase. The normal tensile strength and flushability properties of these articles are not adversely affected when treated with the high internal phase inverse emulsions of the present invention. As a result, users of these articles get comfortable, efficient, moist cleaning without having to change their normal cleaning habits. The application also indicates that the technology is readily useful with other wipes, including wipes for cleaning hard surfaces.

In spite of the significant improvements over prior cleansing wipes, the substrates (also referred to as "carriers") described in the '456 application are lacking in one respect. Specifically, because the carriers described are generally hydrophilic materials, upon shearing of the emulsion in use, a significant amount of water is absorbed into the substrate, and therefore is not available for contact with the item to be cleaned. As such, it is necessary to surface treat the substrate with additional amounts of emulsion to account for the level of water absorbed by the carrier. To address the issue of rapid fluid absorbence by the carrier upon emulsion rupture, co-pending U.S. patent application Ser. No. 08/640,049 (hereafter "'049 application"), filed Apr. 30, 1996 by G. Gordon and L. Mackey, abandoned, describes the use of a carrier that has one or more hydrophobic regions to prevent water absorbence by portions of the substrate. The hydrophobic regions described by this co-pending application are generally described as having permanent hydrophobicity. That is, these regions are essentially unwettable throughout the wiping process and therefore do not contribute significantly to the overall absorbent capacity of the wipe.

Accordingly, in certain circumstances, it would be desirable to provide products for cleaning that offer the benefits provided by the cleansing wipes described in the co-pending '456 application, but which require treatment with reduced levels of emulsion. Similarly, it would be desirable to provide products that have the ability to hinder absorbence such as those described in the co-pending '049 application, but which allow absorbence by essentially all of the carrier. In this regard, a carrier that demonstrates the ability to provide controlled or delayed absorbency may allow for the use of only one carrier material. This would provide, among other things, simplification of processing the wipes, in that a relatively homogeneous carrier could be utilized. Furthermore, the ability to control absorbence of the cleaning solution by the carrier would allow sufficient contact time of the solution on the surface to remove soil, and would allow for the removal of the solution and solubilized soil during the typical wiping process.

Accordingly, it is an object of the present invention to provide nonwoven, preferably paper-based, wiping articles which (i) are initially dry to the touch, but are capable of delivering fluid during the wiping process, (ii) have a controlled rate of absorbency of the fluid released from the article (as well as optional additional cleaning solutions), (iii) have desirably high overall absorbent capacity for liquids and especially effective soil and stain removal performance, and (iv) have sufficient wet strength integrity to withstand the vigors of the wiping process.

SUMMARY OF THE INVENTION

The present invention relates to articles useful in cleansing, and particularly wetlike cleansing wipes. These articles comprise:

a. a carrier; and b. an emulsion applied to the carrier, the emulsion comprising:

(1) from about 2 to about 60% of a continuous, solidified lipid phase comprising a waxy lipid material having a melting point of about 30° C. or higher;

(2) from about 39 to about 97% of an internal polar phase dispersed in the lipid phase; and (3) an effective amount of an emulsifier capable of forming the emulsion when the lipid phase is in a fluid state;

c. wherein the article has a rate of absorbency of distilled water of not more than about 0.35 gram per gram of carrier per second.

The present invention further relates to a method for making these articles. This method comprises the steps of:

A. forming an emulsion comprising:

(1) from about 2 to about 60% of a continuous external lipid phase comprising a waxy lipid material having a melting point of about 30° C. or higher;

(2) from about 39 to about 97% of an internal polar phase dispersed in the external lipid phase; and (3) an effective amount of an emulsifier capable of forming the emulsion when the external lipid phase is in a fluid state;

B. applying the emulsion to a carrier at a temperature sufficiently high such that the external lipid phase has a fluid or plastic consistency; and C. cooling the applied emulsion to a temperature sufficiently low such that the external lipid phase solidifies.

The articles of the present invention offer a number of significant advantages over prior cleaning products when in the form of wet-like cleansing wipes such as those used for cleaning of hardsurfaces (e.g., floors, countertops, sinks, bathtubs, toilets, and the like). Applicants have discovered that an important aspect of cleaning performance is the avoidance of initial, rapid fluid uptake by the article. In particular, while it is generally desirable to absorb the fluid cleaning solution released from the article's emulsion during the time in which a typical user will clean a surface, it is also important to avoid immediate, rapid absorption by the article. While not wishing to be bound by theory, it is believed that avoiding rapid uptake of the released internal phase allows for enhanced dwell time of the polar phase components on the surface being cleaned, thereby enhancing the solubilization of soils. (This may have particular benefits where a disinfectant or antimicrobial is contained in the emulsion's internal phase.)

The articles of the present invention can be used in many other applications requiring the delivery of polar materials, in particular water and water-soluble or dispersible actives. These include wipes for personal cleansing, such as baby wipes, as well as those for the delivery of water-soluble or dispersible antimicrobials or pharmaceutical actives.

These articles can also perform multiple functions. For example, the high internal phase inverse emulsion applied to these articles can be formulated to provide cleaning and waxing benefits at the same time when used on items such as furniture, shoes, automobiles, and the like.

DETAILED DESCRIPTION

Figure 1:
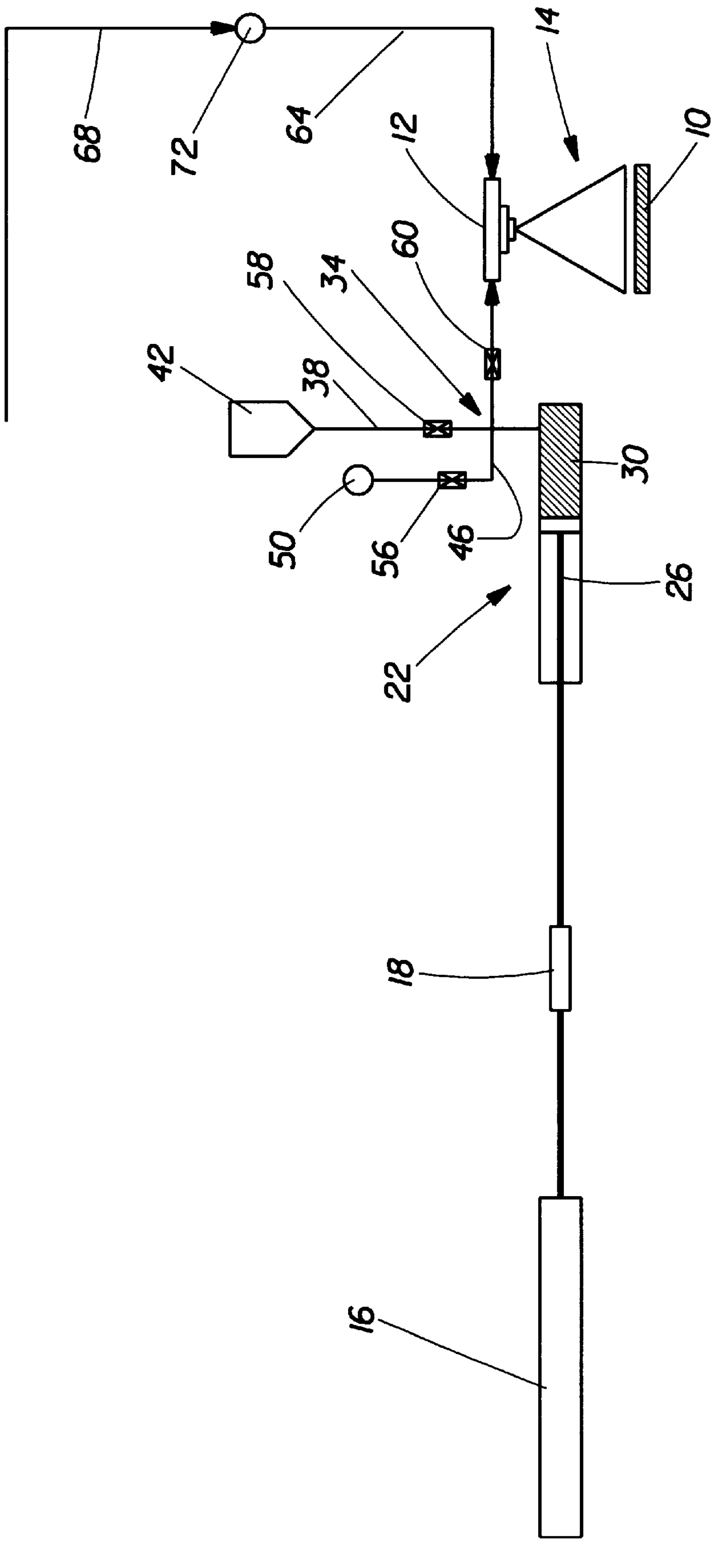
FIG. 1 is a schematic representation illustrating a spray system for applying the high internal phase inverse emulsions of the present invention to a carrier such as a treated paper web.

As used herein, the term "comprising" means that the various components, ingredients, or steps, can be conjointly employed in practicing the present invention. Accordingly, the term "comprising" encompasses the more restrictive terms "consisting essentially of" and "consisting of."

As used herein, the terms "detergent", "detersive surfactant" and "detergent surfactant" are used interchangeably, and refer to any substance that reduces the surface tension of water, specifically a surface-active agent which concentrates at oil-water interfaces, exerts emulsifying action, and thus aids in removing soils.

As used herein, the term "hydrophilic" is used to refer to surfaces that are wettable by aqueous fluids deposited thereon. Hydrophilicity and wettability are typically defined in terms of contact angle and the surface tension of the fluids and solid surfaces involved. This is discussed in detail in the American Chemical Society publication entitled *Contact Angle, Wettability and Adhesion*, edited by Robert F. Gould (Copyright 1964), which is hereby incorporated herein by reference. A surface is said to be wetted by a fluid (i.e., hydrophilic) when either the contact angle between the fluid and the surface is less than 90°, or when the fluid tends to spread spontaneously across the surface, both conditions normally co-existing. Conversely, a surface is considered to be "hydrophobic" if the contact angle is greater than 90° and the fluid does not spread spontaneously across the surface.

As used herein, the term "polar" means a molecule that possesses a dipole moment, i.e., a molecule of which the positive and negative electrical charges are permanently separated, as opposed to a nonpolar molecule in which the charges coincide. A "polar fluid" may comprise one or more polar constituents.

As used herein, the term "polarphilic" is used to refer to surfaces that are wettable by polar fluids deposited thereon. Polarphilicity and wettability are typically defined in terms of contact angle and the surface tension of the fluids and solid surfaces involved. A surface is said to be wetted by a polar fluid (i.e., polarphilic) when either the contact angle between the polar fluid and the surface is less than 90°, or when the polar fluid tends to spread spontaneously across the surface, both conditions normally co-existing. Conversely, a surface is considered to be "polarphobic" if the contact angle is greater than 90° and the fluid does not spread spontaneously across the surface. Since water is generally the preferred polar material used in the present invention, preferred embodiments discussed herein refer to a substrate's "hydrophilicity" and "hydrophobicity". However, use of such terms is not so limited and should be read to include "polarphilic" and "polarphobic" substrates.

All percentages, ratios and proportions used herein are by weight unless otherwise specified.

A. Carriers for High Internal Phase Inverse Emulsion

As indicated, Applicants have discovered that an important aspect of the cleaning performance of the present articles is the ability to initially avoid fluid uptake. In particular, the articles of the present invention have a rate of absorbency of distilled water of not more than about 0.35 gram per gram of carrier per second, as measured using the Horizontal Gravimetric Wicking method described in the Test Methods section. Preferably, the articles of the present invention will have a rate of fluid absorbency of not more than about 0.25 gram per gram of carrier per second, more preferably not more than about 0.17 gram per gram of carrier per second, still more preferably from about 0.05 to about 0.17 gram per gram of carrier per second.

While controlled rate of absorbency is important, the articles of the present invention will preferably have the ability to absorb fluid released from the internal phase during the typical wiping process. In this regard, the articles of the present invention preferably have an absorbent capacity of at least about 1 gram of distilled water per gram of carrier, as measured according the Horizontal Full Sheet method described in the Test Methods section below. Preferably, the articles will have an absorbent capacity of at least about 5 gram per gram of carrier, more preferably at least about 15 gram per gram of carrier.

In light of Applicants' discovery that controlled absorbency plays an important role in the cleaning performance of the articles of the present invention, the skilled artisan will recognize that the rate of fluid absorption of the internal phase components by the article is dictated primarily by the materials of the carrier. In this regard, volume flux (i.e., rate of fluid uptake) of the carrier may be calculated using the Hagen-Poiseuille law for laminar flow. The Hagen-Poiseuille law provides that volume flux, q, is calculated according to the following formula:

$$q=R^2[(2\gamma \cos \theta/R)-\rho gL]/8L\mu$$

where R is the tube radius, $\gamma$ is the surface tension of the fluid being absorbed, $\theta$ is the contact angle at the fluid-solid interface, $\rho$ is the density of the fluid, g is the gravitational constant, L is the wetted length of the tube, and $\mu$ is the viscosity of the fluid. From this equation, it is evident that the rate of absorbency by the cleaning pad is controllable by, for example, adjusting the pore size of the material constituting the carrier, adjusting the surface wettability ($\cos \theta$) of the carrier material for the fluid to be absorbed, adjusting the surface tension, viscosity and/or density of the internal polar phase of the emulsion, and the like. Together with the teachings of the present disclosure, any of the well known absorbent materials may be utilized to achieve the desired rate of absorbency, and overall absorbent capacity. Accordingly, while representative materials and embodiments useful as the carrier are described below, the invention is not limited to such materials and embodiments.

The skilled artisan will recognize that there are various means for obtaining the desired rate of internal phase absorption. Approaches relating specifically to the carrier include providing temporary or reversible polarphobicity to the carrier and effecting the rate of absorption of polar fluids into the carrier by controlling the polarphobicity of the carrier material. In the first approach, the carrier will initially be polarphobic. However, after exposure to the internal polar phase (e.g., water), the carrier will undergo a physical change that results in its becoming more polarphilic. In contrast, the second approach will utilize a carrier whose polarphobicity does not change significantly during the wiping process, but whose rate of fluid absorption is such that the carrier provides the requisite controlled absorbency rate and overall absorbency.

In a preferred embodiment for providing temporary polarphobicity, a naturally polarphilic carrier material will be treated to provide initial polarphobicity. During the wiping process, the material providing the polarphobicity will be modified, e.g., by chemical reaction (e.g., acid or base hydrolysis), by removal (e.g., solubilization), by pH increase to neutralize a polarphobic material, etc., to provide a polarphilic carrier. In preferred embodiments, the internal polar phase of the emulsion will comprise significant levels of water. As such, the carrier will exhibit temporary hydrophobicity. While the disclosure that follows refers to hydrophilic and hydrophobic materials, the skilled artisan will recognize that other "polarphilic" and "polarphobic" materials may be used to provide the same benefits.

In those embodiments where chemical modification is utilized, naturally hydrophilic fibers (e.g., cellulosic fibers) may be rendered temporarily hydrophobic by surface treatment with a hydrophobic ester or amide which is subsequently acid or base hydrolyzed. The required acid or base may be incorporated into the internal phase of the emulsion. Preferred materials are "activated" esters which hydrolyze rapidly at neutral pH. Such materials include ester-functional ammonium compounds such as those described in U.S. Pat. No. 5,538,595, issued Jul. 23, 1996 to P. Trokhan et al.; and vegetable oil based quaternary ammonium compounds such as those described in U.S. Pat. No. 5,510,000, issued Apr. 23, 1996 to D. Phan, et al. The disclosure of both of these patents is incorporated by reference herein.

In those embodiments where solubilization is utilized, naturally hydrophilic fibers (e.g., cellulosic fibers) may be surface-coated with a hydrophobic material such as a fatty acid (e.g., stearic acid) that is neutralized upon exposure to the internal polar phase.

In still another embodiment, a distinct fluid impermeable layer may be incorporated in the carrier that will degrade on exposure to the emulsion's internal phase components so as to provide a hydrophilic carrier. Examples of materials that will initially prevent fluid flow but later be solubilized to allow fluid flow throughout the carrier include polyvinyl alcohol, polyethylene glycol, polyvinylpyrrolidone, and other water soluble polymers.

Carriers useful in the present invention can be in a variety of substrate forms. Suitable carrier substrates include woven materials, nonwoven materials, foams, sponges, battings, balls, puffs, films, and the like. Particularly preferred substrates for use in the present invention are nonwoven types. These nonwoven substrates can comprise any conventionally fashioned nonwoven sheet or web having suitable basis weight, caliper (thickness), absorbency and strength characteristics. Nonwoven substrates can be generally defined as bonded fibrous or filamentous products having a web structure, in which the fibers or filaments are distributed randomly as in "air-laying" or certain "wet-laying" processes, or with a degree of orientation, as in certain "wet-laying" or "carding" processes. The fibers or filaments of such nonwoven substrates can be natural (e.g., wood pulp, wool, silk, jute, hemp, cotton, linen, sisal or ramic) or synthetic (e.g., rayon, cellulose ester, polyvinyl derivatives, polyolefins, polyamides or polyesters ) and can be bonded together with a polymeric binder resin. Examples of suitable commercially available nonwoven substrates include those marketed under the tradename Sontara® by DuPont and Polyweb® by James River Corp.

Of course, regardless of what carrier material is selected, the carrier will provide the requisite absorbent rate and absorbent capacity values that define the articles of the present invention. As indicated, where temporary hydrophobicity is employed to provide the desired absorbency rate, the materials comprising the carrier will be naturally hydrophilic. Where a relatively constant, controlled rate of absorbency is desired, a certain level of hydrophobicity may be permanently incorporated into an otherwise hydrophilic substrate.

Regardless of the approach utilized to provide the delay in absorbency, for reasons of cost, ease of manufacture and article disposability, the preferred type of nonwoven substrate used in wipes of the present invention comprise those made from wood pulp fibers, i.e., paper webs. As noted, paper webs can be prepared by either air-laying or wetlaying techniques. Air-laid paper webs such as Air Tex® SC130 are commercially available from James River Corp. More conventionally, paper webs are made by wetlaying procedures. In such procedures, a web is made by forming an aqueous papermaking furnish, depositing this furnish onto a foraminous surface, such as a Fourdrinier wire, and by then removing water from the furnish, for example by gravity, by vacuum assisted drying and/or by evaporation, with or without pressing, to thereby form a paper web of desired fiber consistency. In many cases, the papermaking apparatus is set up to rearrange the fibers in the slurry of papermaking furnish as dewatering proceeds in order to form paper substrates of especially desirable strength, hand, bulk, appearance, absorbency, etc.

The papermaking furnish utilized to form the preferred paper web substrates for articles of the present invention essentially comprises an aqueous slurry of papermaking fibers (i.e., paper pulp) and can optionally contain a wide variety of chemicals such as wet strength resins, surfactants, pH control agents, softness additives, debonding agents and the like. Wood pulp in all its variations can be used to form the papermaking furnish. Wood pulps useful herein include both sulfite and sulfate pulps, as well as mechanical, thermomechanical and chemi-thermo-mechanical pulps, all of which are well known to those skilled in the papermaking art. Pulps derived from both deciduous or coniferous trees can be used. Preferably the papermaking furnish used to form the preferred paper web substrates for wipes of the present invention comprises Kraft pulp derived from northern softwoods.

A number of papermaking processes have been developed which utilize a papermaking apparatus that forms paper webs having particularly useful or desirable fiber configurations. Such configurations can serve to impart such characteristics of the paper web as enhanced bulk, absorbency and strength. One such process employs an imprinting fabric in the papermaking process that serves to impart a knuckle pattern of high density and low density zones into the resulting paper web. A process of this type, and the papermaking apparatus for carrying out this process, is described in greater detail in U.S. Pat. No. 3,301,746 (Sanford et al), issued Jan. 31, 1967, which is incorporated by reference.

Another papermaking process employs a throughdrying fabric having impression knuckles raised above the plane of the fabric. These impressions create protrusions in the throughdried sheet, and provide the sheet with stretch in the cross-machine direction. A process of this type is described in European Patent Publication No. 677,612A2, published Oct. 18, 1995 by G. Wendt et al., the disclosure of which is incorporated herein by reference.

Still another papermaking process carried out with a special papermaking apparatus is one that provides a paper web having a distinct, continuous network region formed by a plurality of "domes" dispersed throughout the network region on the substrate. Such domes are formed by compressing an embryonic web as formed during the papermaking process into a foraminous deflection member having a patterned network surface formed by a plurality of discrete isolated deflection conduits in the deflection member surface. A process of this type, and apparatus for carrying out such a process, is described in greater detail in U.S. Pat. No. 4,529,480 (Trokhan), issued Jul. 16, 1985; U.S. Pat. No. 4,637,859 (Trokhan), issued Jan. 20, 1987; and U.S. Pat. No. 5,073,235 (Trokhan), issued Dec. 17, 1991, all of which are incorporated by reference. Another type of papermaking process, and apparatus to carry it out that is suitable for making layered composite paper substrates is described in U.S. Pat. No. 3,994,771 (Morgan et al), issued Nov. 30, 1976, which is incorporated by reference.

The preferred paper web substrates can form one of two or more plies that can be laminated together. Lamination, and lamination carried out in combination with an embossing procedure to form a plurality of protuberances in the laminated product, is described in greater detail in U.S. Pat. No. 3,414,459 (Wells), issued Dec. 3, 1968, which is incorporated by reference. These paper substrates preferably have a basis weight of between about 10 g/$m^2$ and about 100 g/$m^2$, and density of about 0.6 g/cc or less. More preferably, the basis weight will be about 40 g/$m^2$ or less and the density will be about 0.3 g/cc or less. Most preferably, the density will be between about 0.04 g/cc and about 0.2 g/cc. See Column 13, lines 61–67, of U.S. Pat. No. 5,059,282 (Ampulski et al), issued Oct. 22, 1991, which describes how the density of tissue paper is measured. (Unless otherwise specified, all amounts and weights relative to the paper web substrates are on a dry weight basis.)

In addition to papermaking fibers, the papermaking furnish used to make these paper web substrates can have other components or materials added thereto which are or later become known in the art. The types of additives desirable will be dependent upon the particular end use of the tissue sheet contemplated. For example, in wipe products such as paper towels, facial tissues, baby wipes and other similar products, high wet strength is a desirable attribute. Thus, it is often desirable to add to the papermaking furnish chemical substances known in the art as "wet strength" resins.

A general dissertation on the types of wet strength resins utilized in the paper art can be found in TAPPI monograph series No. 29, Wet Strength in Paper and Paperboard, Technical Association of the Pulp and Paper Industry (New York, 1965). The most useful wet strength resins have generally been cationic in character. For permanent wet strength generation, polyamide-epichlorohydrin resins are cationic wet strength resins have been found to be of particular utility. Suitable types of such resins are described in U.S. Pat. No. 3,700,623 (Keim), issued Oct. 24, 1972, and U.S. Pat. No. 3,772,076 (Keim), issued Nov. 13, 1973, both of which are incorporated by reference. One commercial source of a useful polyamide-epichlorohydrin resin is Hercules, Inc. of Wilmington, Del., which markets such resins under the mark Kymene® 557H.

Polyacrylamide resins have also been found to be of utility as wet strength resins. These resins are described in U.S. Pat. Nos. 3,556,932 (Coscia et al), issued Jan. 19, 1971, and 3,556,933 (Williams et al), issued Jan. 19, 1971, both of which are incorporated by reference. One commercial source of polyacrylamide resins is American Cyanamid Co. of Stamford, Conn., which markets one such resin under the mark Parez® 631 NC.

Still other water-soluble cationic resins finding utility as wet strength resins are urea formaldehyde and melamine formaldehyde resins. The more common functional groups of these polyfunctional resins are nitrogen containing groups such as amino groups and methylol groups attached to nitrogen. Polyethylenimine type resins can also find utility in the present invention. In addition, temporary wet strength resins such as Caldas 10® (manufactured by Japan Carlit), Parez 750® (manufactured by American Cyanamide Co.), and CoBond 1000® (manufactured by National Starch and Chemical Company) can be used in the present invention. It is to be understood that the addition of chemical compounds such as the wet strength and temporary wet strength resins discussed above to the pulp furnish is optional and is not necessary for the practice of the present invention.

In addition to wet strength additives, it can also be desirable to include in the papermaking fibers certain dry strength and lint control additives known in the art. In this regard, starch binders have been found to be particularly suitable. In addition to reducing linting of the paper substrate, low levels of starch binders also impart a modest improvement in the dry tensile strength without imparting stiffness that could result from the addition of high levels of starch. Typically the starch binder is included in an amount such that it is retained at a level of from about 0.01 to about 2%, preferably from about 0.1 to about 1%, by weight of the paper substrate.

In general, suitable starch binders for these paper web substrates are characterized by water solubility, and hydrophilicity. Although it is not intended to limit the scope of suitable starch binders, representative starch materials include corn starch and potato starch, with waxy corn starch known industrially as amioca starch being particularly preferred. Amioca starch differs from common corn starch in that it is entirely amylopectin, whereas common corn starch contains both amylopectin and amylose. Various unique characteristics of amioca starch are further described in "Amioca—The Starch From Waxy Corn," H. H. Schopmeyer, Food Industries, Dec. 1945, pp. 106–108 (Vol. pp. 1476–1478).

The starch binder can be in granular or dispersed form, the granular form being especially preferred. The starch binder is preferably sufficiently cooked to induce swelling of the granules. More preferably, the starch granules are swollen, as by cooking, to a point just prior to dispersion of the starch granule. Such highly swollen starch granules shall be referred to as being "fully cooked." The conditions for dispersion in general can vary depending upon the size of the starch granules, the degree of crystallinity of the granules, and the amount of amylose present. Fully cooked amioca starch, for example, can be prepared by heating an aqueous slurry of about 4% consistency of starch granules at about 190° F. (about 88° C.) for between about 30 and about 40 minutes. Other exemplary starch binders that can be used include modified cationic starches such as those modified to have nitrogen containing groups, including amino groups and methylol groups attached to nitrogen, available from National Starch and Chemical Company, (Bridgewater, N.J.), that have previously been used as pulp furnish additives to increase wet and/or dry strength.

Many of the materials described as useful as the optional hydrophilic substrate layer are inherently hydrophilic. Materials which are not naturally hydrophilic can be treated with any of a variety of hydrophilizing agents well known in the art. Suitable surfactants for hydrophilizing include, for example, ethoxylated esters such as Pegosperse® 200-ML, manufactured by Glyco Chemical, Inc. of Greenwich, Conn., ATMER® 645, manufactured by ICI, glucose amides, tri-block copolymers of ethylene oxide and propylene oxide such as Pluronic® P103, manufactured by BASF, and copolymers of silicone and ethylene glycol such as DC190, manufactured by Dow Corning of Midland, Mich. Surfactants may be applied to the surface of the substrate by spraying, printing, or other suitable methods such as disclosed in U.S. Pat. No. 4,950,264, issued to Osborn on Aug. 21, 1990, the disclosure of which is incorporated herein by reference.

One means for providing a constant, controlled rate of fluid absorption is to use a relatively hydrophobic material. Such hydrophobic materials include silicones, curable silicones, amino silicones, quaternary amino silicones, carboxylated silicones, ethoxylated silicones, and the like. Representative of such materials are those silicones described in U.S. Pat. No. 5,246,546, U.S. Pat. No. 5,059, 282 and U.S. Pat. No. 5,164,046, all issued to R. S. Ampulski et al., U.S. Pat. No. 5,558,873, issued Mar. 8, 1995 to Funk et al., and U.S. Pat. No. 5,552,020, issued Jul. 21, 1995 to Smith et al., the disclosure of each of which is incorporated herein by reference. The materials that provide the controlled absorbency of fibers such as cellulose may be added internally, via wet-end addition by addition to the paper furnish, or externally, via dry-end surface treatment. Preferably, the carriers of the present invention will be formed via wet-end addition of the hydrophobic material.

One disadvantage of applying the high internal phase emulsion to a polarphillic surface such as a tissue carrier is that the emulsion can wick into the paper carrier during application of the emulsion to the carrier (i.e., when the external lipid phase is molten), which may lead to loss of the internal polar phase. One means to alleviate this potential problem is to apply a sizing agent to the surface of the paper before application of the high internal phase emulsion. (Addition of the sizing agent after carrier formation, or via dry end addition, is referred to as "external sizing".) Thus, more water is available in the article for use at the appropriate time. Surface sizing can be performed by application of, e.g., an amino silicone at the calender stack, such as is described in U.S. Pat. No. 5,246,546. Other sizing agents such as starch, animal glue, polyvinyl alcohol, wax emulsions, or alkylketene dimers (AKD) can also be used.

In another application, the carrier can be internally sized. This carrier can then be coated with emulsion. The benefits to internal sizing pretreatment of the carrier is to reduce water loss during storage as described above, as well as provide a substrate that would allow passage of the water through the article and make it available for use in a cleaning situation. Internal sizing can be accomplished by addition of a sizing agent to the wet end of the papermachine during the forming stage of the papermaking process. One method to accomplish this task is through the use of internal sizing agents such as cationic ketene dimers, or salts of rosin acids, salts of long chain fatty acids, silicone oils in combination with a cationic wet strength agent such as Kymene 557H® available from Hercules, Wilmington, Del., and the like.

A preferred method for making an article of this type is to add at least about 0.01% silicone, preferably between about 0.01 and about 2% of an amino silicone such as CM2261D1 available from General Electric, Schnectedy, N.Y., or emulsified Dow 8075 available from Dow Coming, Midland, Mich., in the wet end of the papermachine along with about 0.25 to 2% of Kymene 557H. Between about 0.1 and 1% Carboxymethyl cellulose may also be added as required for dry strength. (These levels are based on the dry weight of the fibers.) The level of Kymene 557H may be adjusted to provide the appropriate level of wet strength for the end product. The level of amino silicone may be adjusted to provide the required level of hydrophobicity to the paper carrier.

Other sizing agents and methods for application which are useful for the purposes of this process are described in Pulp and Paper Chemistry and Technology, Third Edition, Volume 3, Edited by James P. Casey, Wiley-Interscience, 1981, which is incorporated herein by reference.

B. High Internal Phase Inverse Emulsion

The articles of the present invention comprise a carrier that is treated with a high internal phase inverse emulsion. The emulsion comprises: (1) a continuous solidified lipid phase; (2) an emulsifier that forms the emulsion when the lipid phase is fluid; and (3) an internal polar phase dispersed in the lipid phase. This emulsion ruptures when subjected to low shear during use, e.g., wiping of the skin or other surface, so as to release the internal polar phase.

1. External Lipid Phase

The continuous solidified lipid phase provides the essential stabilizing structure for the high internal phase inverse emulsions of the present invention. In particular, this continuous lipid phase is what keeps the dispersed internal phase from being prematurely released prior to use of the article, such as during storage.

The continuous lipid phase can comprise from about 2 to about 60% of the emulsion of the present invention. Preferably, this continuous lipid phase will comprise from about 5 to about 30% of the emulsion. Most preferably, this lipid phase will comprise from about 6 to about 15% of the emulsion.

The major constituent of this continuous lipid phase is a waxy lipid material. This lipid material is characterized by a melting point of about 30° C. or higher, i.e., is solid at ambient temperatures. Preferably, the lipid material has a melting point of about 50° C. or higher. Typically, the lipid material has a melting point in the range of from about 40 to about 80° C., more typically in the range of from about 50 to about 70° C.

Although this waxy lipid material is solid at ambient temperatures, it also needs to be fluid or plastic at those temperatures at which the high internal phase inverse emulsion is applied to the carrier. Moreover, even though the lipid material is fluid or plastic at those temperatures at which the emulsion is applied to the carrier substrate, it should still desirably be somewhat stable (i.e., minimal coalescence of emulsion micro-droplets) for extended periods of time at elevated temperatures (e.g., about 50° C. or higher) that are normally encountered during storage and distribution of the articles of the present invention. This lipid material also needs to be sufficiently brittle at the shear conditions of use of the article such that it ruptures and releases the dispersed internal polar phase. These lipid materials should also desirably provide a good feel to the skin when used in personal care products such as wet-like cleansing wipes and tissue used in perianal cleaning.

Suitable waxy lipid materials for use in the high internal phase inverse emulsion of the present invention include natural and synthetic waxes, as well as other oil soluble materials having a waxy consistency. As used herein, the term "waxes" refers to organic mixtures or compounds that are generally water-insoluble and tend to exist as amorphous or microcrystalline or crystalline solids at ambient temperatures (e.g., at about 25° C.). Suitable waxes include various types of hydrocarbons, as well as esters of certain fatty acids and fatty alcohols. They can be derived from natural sources (i.e., animal, vegetable or mineral) or they can be synthesized. Mixtures of these various waxes can also be used.

Some representative animal and vegetable waxes that can be used in the present invention include beeswax, carnauba, spermaceti, lanolin, shellac wax, candelilla, and the like. Particularly preferred animal and vegetable waxes are beeswax, lanolin and candelilla. Representative waxes from mineral sources that can be used in the present invention include petroleum-based waxes such as paraffin, petrolatum and microcrystalline wax, and fossil or earth waxes such as white ceresine wax, yellow ceresine wax, white ozokerite wax, and the like. Particularly preferred mineral waxes are petrolatum, microcrystalline wax, yellow ceresine wax, and white ozokerite wax. Representative synthetic waxes that can be used in the present invention include ethylenic polymers such as polyethylene wax, chlorinated naphthalenes such as "Halowax," hydrocarbon type waxes made by Fischer-Tropsch synthesis, and the like. Particularly preferred synthetic waxes are polyethylene waxes.

Besides the waxy lipid material, the continuous lipid phase can include minor amounts of other lipophilic or lipid-miscible materials. These other lipophilic/lipid-miscible materials are typically included for the purpose of stabilizing the emulsion to minimize loss of the internal polar phase or for improving the aesthetic feel of the emulsion on the skin. Suitable materials of this type that can be present in the continuous lipid phase include hot melt adhesives such as Findley 193-336 resin, long chain alcohols such as cetyl alcohol, stearyl alcohol, and cetaryl alcohol, water-insoluble soaps such as aluminum stearate, silicone polymers such as polydimethylsiloxanes, hydrophobically modified silicone polymers such as phenyl trimethicone, and the like. Other suitable lipophilic/lipid miscible materials include polyol polyesters. By "polyol polyester" is meant a polyol having at least 4 ester groups. By "polyol" is meant a polyhydric alcohol containing at least 4, preferably from 4 to 12, and, most preferably from 6 to 8, hydroxyl groups. Polyols include monosaccharides, disaccharides and trisaccharides, sugar alcohols and other sugar derivatives (e.g., alkyl glycosides), polyglycerols (e.g., diglycerol and triglycerol), pentaerythritol, and polyvinyl alcohols. Preferred polyols include xylose, arabinose, ribose, xylitol, erythritol, glucose, methyl glucoside, mannose, galactose, fructose, sorbitol, maltose, lactose, sucrose, raffinose, and maltotriose. Sucrose is an especially preferred polyol. With respect to the polyol polyesters useful herein, it is not necessary that all of the hydroxyl groups of the polyol be esterified, however disaccharide polyesters should have no more than 3, and more preferably no more than 2 unesterified hydroxyl groups. Typically, substantially all (e.g., at least about 85%) of the hydroxyl groups of the polyol are esterified. In the case of sucrose polyesters, typically from about 7 to 8 of the hydroxyl groups of the polyol are esterified.

By "liquid polyol polyester" is meant a polyol polyester from the hereinbefore described groups having a fluid consistency at or below about 37° C. By "solid polyol polyester" is meant a polyol polyester from the hereinbefore described groups having a plastic or solid consistency at or above about 37° C. Liquid polyol polyesters and solid polyol polyesters may be successfully employed as emollients and immobilizing agents, respectively, in emulsions of the present invention. In some cases, solid polyol polyesters may also provide some emolliency functionality.

2. Internal Polar Phase

Typically, the major component of the high internal phase inverse emulsions of the present invention is the dispersed internal polar phase. In preferred embodiments, the polar phase will contain a significant percentage of water, preferably at least about 60%, by weight of the emulsion, more preferably at least about 75%, by weight, still more preferably at least about 90%, by weight.

The internal polar phase can provide a number of different benefits when released. For example, in wet-like cleaning wipes for perianal cleaning where the internal polar phase is water, it is this released water that provides the primary cleansing action for these wipes.

In a preferred embodiment of the present invention the internal polar phase (preferably comprising water as a major constituent) is a disinfecting polar phase comprising an antimicrobial compound, preferably an essential oil or an active thereof, and a bleach, preferably a peroxygen bleach. Disinfecting wipes comprising such an internal disinfecting polar phase provide effective disinfecting performance on a surface while being safe to the surface treated.

By "effective disinfecting performance" it is meant herein that the disinfecting wipes of the present invention allow significant reduction in the amount of bacteria on an infected surface. Indeed, effective disinfection may be obtained on various microorganisms including Gram positive bacteria like Staphylococcus aureus, and Gram negative bacteria like Pseudomonas aeruginosa, as well as on more resistant micro-organisms like fungi (e.g., Candida albicans) present on infected surfaces.

Another advantage of the disinfecting wipes according to the present invention is that besides the disinfection properties delivered, good cleaning is also provided as the disinfecting polar phase may further comprise surfactants and/or solvents.

An essential element of the internal disinfecting polar phase is an antimicrobial compound typically selected from the group consisting of an essential oil and an active thereof, paraben (e.g., methyl paraben, ethyl paraben), glutaraldehyde and mixtures thereof. Essential oils or actives thereof are the preferred antimicrobial compounds to be used herein.

Suitable essential oils or actives thereof to be used herein are those essential oils which exhibit antimicrobial activity and more particularly antibacterial activity. By "actives of essential oils" it is meant herein any ingredient of essential oils that exhibits antimicrobial/antibacterial activity. A further advantage of said essential oils and actives hereof is that they impart pleasant odor to the disinfecting wipes according to the present invention without the need of adding a perfume. Indeed, the disinfecting wipes according to the present invention deliver not only excellent disinfecting performance on infected surfaces but also good scent.

Such essential oils include, but are not limited to, those obtained from thyme, lemongrass, citrus, lemons, oranges, anise, clove, aniseed, cinnamon, geranium, roses, mint, lavender, citronella, eucalyptus, peppermint, camphor, sandalwood and cedar and mixtures thereof Actives of essential oils to be used herein include, but are not limited to, thymol (present for example in thyme), eugenol (present for example in cinnamon and clove), menthol (present for example in mint), geraniol (present for example in geranium and rose), verbenone (present for example in vervain), eucalyptol and pinocarvone (present in eucalyptus), cedrol (present for example in cedar), anethol (present for example in anise), carvacrol, hinokitiol, berberine, terpineol, limonene, methyl salycilate and mixtures thereof. Preferred actives of essential oils to be used herein are thymol, eugenol, verbenone, eucalyptol, carvacrol, limonene and/or geraniol. Thymol may be commercially available for example from Aldrich, eugenol may be commercially available for example from Sigma, Systems—Bioindustries (SBI)—Manheimer Inc.

Typically, the antimicrobial compound or mixtures thereof will be present in the internal polar phase at a level of from 0.001% to 5%, preferably from 0.001% to 3%, more preferably from 0.005% to 1%, by weight of total internal polar phase.

An important element of the internal disinfecting polar phase is a bleach or mixtures thereof. Any bleach known to those skilled in the art may be suitable to be used herein including any chlorine bleach as well as any peroxygen bleach. The presence of the bleach, preferably the peroxygen bleach, in the disinfecting wipes of the present invention contribute to the disinfection properties of the wipes.

Suitable chlorine bleaches to be used herein include any compound capable of releasing chlorine when said compound is in contact with water. Suitable chlorine bleaches include alkali metal dichloroisocyanurates as well as alkali metal hypohalites like hypochlorite and/or hypobromite. Preferred chlorine bleaches are alkali metal hypochlorites.

Various forms of alkali metal hypochlorite are commercially available, for instance sodium hypochlorite.

Preferred bleaches for use herein are peroxygen bleaches, more particularly hydrogen peroxide, or a water soluble source thereof, or mixtures thereof. Hydrogen peroxide is particularly preferred.

Peroxygen bleaches like hydrogen peroxide are preferred herein as they are generally well accepted from an environmental point of view. For example the decomposition products of hydrogen peroxide are oxygen and water.

As used herein, a hydrogen peroxide source refers to any compound which produces perhydroxyl ions when said compound is in contact with water. Suitable watersoluble sources of hydrogen peroxide for use herein include percarbonates, persilicates, persulphates such as monopersulfate, perborates, peroxyacids such as diperoxydodecandioic acid (DPDA), magnesium perphthalic acid, dialkylperoxides, diacylperoxides, performed percarboxylic acids, organic and inorganic peroxides and/or hydroperoxides and mixtures thereof.

Typically, the bleach or mixtures thereof is present at a level of from 0.001% to 15% by weight of the total internal polar phase, preferably from 0.001% to 5%, and more preferably from 0.005% to 2%.

The internal disinfecting polar phase may further comprise a detersive surfactant or a mixture thereof. Typically, the surfactant or mixtures thereof is present at a level of from 0.001% to 40% by weight of the total internal polar phase, preferably from 0.01% to 10% and more preferably from 0.05% to 2%.

Suitable detersive surfactants to be used in the present invention include any surfactant known to those skilled in the art like nonionic, anionic, cationic, amphoteric and/or zwitterionic surfactants. Preferred detersive surfactants to be used herein are the amphoteric and/or zwitterionic surfactants.

Suitable amphoteric detersive surfactants to be used herein include amine oxides of the formula $R^1R^2R^3NO$, wherein each of $R^1$, $R^2$ and $R^3$ is independently a saturated, substituted or unsubstituted, linear or branched hydrocarbon chain having from 1 to 30 carbon atoms. Preferred amine oxide surfactants to be used according to the present invention are amine oxides of the formula $R^1R^2R^3NO$, wherein $R^1$ is an hydrocarbon chain having from 1 to 30 carbon atoms, preferably from 6 to 20, more preferably from 8 to 16, most preferably from 8 to 12, and wherein $R^2$ and $R^3$ are independently substituted or unsubstituted, linear or branched hydrocarbon chains having from 1 to 4 carbon atoms, preferably from 1 to 3 carbon atoms, and more preferably are methyl groups. $R^1$ may be a saturated, substituted or unsubstituted, linear or branched hydrocarbon chain. Suitable amine oxides for use herein are for instance natural blend $C_8$–$C_{10}$ amine oxides as well as $C_{12}$–$C_{16}$ amine oxides commercially available from Hoechst. Amine oxides are preferred herein as they deliver effective cleaning performance and further participate to the disinfecting properties of the disinfecting wipes herein.

Suitable zwitterionic surfactants to be used herein contain both cationic and anionic hydrophilic groups on the same molecule at a relatively wide range of pH's. The typical cationic group is a quaternary ammonium group, although other positively charged groups like phosphonium, imidazolinium and sulfonium groups can be used. The typical anionic hydrophilic groups are carboxylates and sulfonates, although other groups such as sulfates, phosphonates, and the like can be used. A generic formula for some zwitterionic surfactants to be used herein is $$R^1—N+(R^2)(R^3)R^4X—$$

wherein $R^1$ is a hydrophobic group; $R^2$ and $R^3$ are each $C_1$–$C_4$ alkyl, hydroxy alkyl or other substituted alkyl group which can also be joined to form ring structures with the N; $R^4$ is a moiety joining the cationic nitrogen atom to the hydrophilic group and is typically an alkylene, hydroxy alkylene, or polyalkoxy group containing from 1 to 10 carbon atoms; and X is the hydrophilic group which is preferably a carboxylate or sulfonate group. Preferred hydrophobic groups $R^1$ are alkyl groups containing from 1 to 24, preferably less than 18, more preferably less than 16 carbon atoms. The hydrophobic group can contain unsaturation and/or substituents and/or linking groups such as aryl groups, amido groups, ester groups and the like. In general, the simple alkyl groups are preferred for cost and stability reasons.

Highly preferred zwitterionic surfactants include betaine and sulphobetaine surfactants, derivatives thereof or mixtures thereof. Said betaine or sulphobetaine surfactants are preferred herein as they help disinfection by increasing the permeability of the bacterial cell wall, thus allowing other active ingredients to enter the cell.

Furthermore, due to the mild action profile of said betaine or sulphobetaine surfactants, they are particularly suitable for the cleaning of delicate surfaces, e.g., hard surfaces in contact with food and/or babies. Betaine and sulphobetaine surfactants are also extremely mild to the skin and/or surfaces to be treated.

Suitable betaine and sulphobetaine surfactants to be used herein are the betaine/sulphobetaine and betaine-like detergents wherein the molecule contains both basic and acidic groups which form an inner salt giving the molecule both cationic and anionic hydrophilic groups over a broad range of pH values. Some common examples of these detergents are described in U.S. Pat. Nos. 2,082,275, 2,702,279 and 2,255,082, incorporated herein by reference. Preferred betaine and sulphobetaine surfactants herein are according to the formula

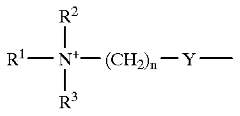

wherein $R^1$ is a hydrocarbon chain containing from 1 to 24 carbon atoms, preferably from 8 to 18, more preferably from 12 to 14, wherein $R^2$ and $R^3$ are hydrocarbon chains containing from 1 to 3 carbon atoms, preferably 1 carbon atom, wherein n is an integer from 1 to 10, preferably from 1 to 6, more preferably is 1, Y is selected from the group consisting of carboxyl and sulfonyl radicals and wherein the sum of $R^1$, $R^2$ and $R^3$ hydrocarbon chains is from 14 to 24 carbon atoms, or mixtures thereof.

Examples of particularly suitable betaine surfactants include $C_{12}$–$C_{18}$ alkyl dimethyl betaine such as coconutbetaine and $C_{10}$–$C_{16}$ alkyl dimethyl betaine such as laurylbetaine. Coconutbetaine is commercially available from Seppic under the trade name of Amonyl 265®. Laurylbetaine is commercially available from Albright & Wilson under the trade name Empigen BB/L®.

Other specific zwitterionic surfactants have the generic formulas:

$$R^1—C(O)—N(R^2)—(C(R^3)_2)_n—N(R^2)\ _2(^+)—(C(R^3)_2)_n—SO_3(^-);$$

or $$R^1—C(O)—N(R^2)—(C(R^3)_2)\ _n—N(R^2)_2(^+)—(C(R^3)_2)_n—COO(^-)$$

wherein each $R^1$ is a hydrocarbon, e.g. an alkyl group containing from 8 up to 20, preferably up to 18, more preferably up to 16 carbon atoms, each $R^2$ is either a hydrogen (when attached to the amido nitrogen), short chain alkyl or substituted alkyl containing from 1 to 4 carbon atoms, preferably groups selected from the group consisting of methyl, ethyl, propyl, hydroxy substituted ethyl or propyl and mixtures thereof, preferably methyl, each $R^3$ is selected from the group consisting of hydrogen and hydroxy groups and each n is a number from 1 to 4, preferably from 2 to 3, more preferably 3, with no more than one hydroxy group in any $(C(R^3)_2)$ moiety. The $R^1$ groups can be branched and/or unsaturated. The $R^2$ groups can also be connected to form ring structures. A surfactant of this type is a $C_{10}$–$C_{14}$ fatty acylamidopropylene-(hydroxypropylene)sulfobetaine that is available from the Sherex Company under the trade name "Varion CAS sulfobetaine"®.

Suitable nonionic surfactants to be used herein are fatty alcohol ethoxylates and/or propoxylates which are commercially available with a variety of fatty alcohol chain lengths and a variety of ethoxylation degrees. Indeed, the HLB values of such alkoxylated nonionic surfactants depend essentially on the chain length of the fatty alcohol, the nature of the alkoxylation and the degree of alkoxylation. Surfactant catalogues are available which list a number of surfactants, including nonionics, together with their respective HLB values.

Particularly suitable for use herein as nonionic surfactants are the hydrophobic nonionic surfactants having an HLB (hydrophilic-lipophilic balance) below 16 and more preferably below 15. Those hydrophobic nonionic surfactants have been found to provide good grease cutting properties.

Preferred nonionic surfactants for use herein are nonionic surfactants according to the formula $RO—(C_2H_4O)_n(C_3H_6O)_mH$, wherein R is a $C_6$ to $C_{22}$ alkyl chain or a $C_6$ to $C_{28}$ alkyl benzene chain, and wherein n+m is from 0 to 20 and n is from 0 to 15 and m is from 0 to 20, preferably n+m is from 1 to 15 and, n and m are from 0.5 to 15, more preferably n+m is from 1 to 10 and, n and m are from 0 to 10. The preferred R chains for use herein are the $C_8$ to $C_{22}$ alkyl chains. Accordingly, suitable hydrophobic nonionic surfactants for use herein are Dobanol R 91-2.5 (HLB=8.1; R is a mixture of $C_9$ and $C_{11}$ alkyl chains, n is 2.5 and m is 0), or Lutensol R TO3 (HLB=8; R is a C13 alkyl chains, n is 3 and m is 0), or Lutensol R AO3 (HLB=8; R is a mixture of $C_{13}$ and $C_{15}$ alkyl chains, n is 3 and m is 0), or Tergitol R 25L3 (HLB=7.7; R is in the range of $C_{12}$ to $C_{15}$ alkyl chain length, n is 3 and m is 0), or Dobanol R 23-3 (HLB=8.1; R is a mixture of $C_{12}$ and $C_{13}$ alkyl chains, n is 3 and m is 0), or Dobanol R 23-2 (HLB=6.2; R is a mixture of $C_{12}$ and $C_{13}$ alkyl chains, n is 2 and m is 0), or Dobanol R 45-7 (HLB=11.6; R is a mixture of $C_{14}$ and $C_{15}$ alkyl chains, n is 7 and m is 0) Dobanol R 23-6.5 (HLB=1.9; R is a mixture of $C_{12}$ and $C_{13}$ alkyl chains, n is 6.5 and m is 0), or Dobanol R 25-7 (HLB=12; R is a mixture of $C_{12}$ and $C_{15}$ alkyl chains, n is 7 and m is 0), or Dobanol R 91-5 (HLB=11.6; R is a mixture of $C_9$ and $C_{11}$ alkyl chains, n is 5 and m is 0), or Dobanol R91-6 (HLB=12.5; R is a mixture of $C_9$ and $C_{11}$ alkyl chains, n is 6 and m is 0), or Dobanol R91-8 (HLB=13.7; R is a mixture of $C_9$ and $C_{11}$ alkyl chains, n is 8 and m is 0), Dobanol R91-10 (HLB=14.2; R is a mixture of $C_9$ to $C_{11}$ alkyl chains, n is 10 and m is 0), or mixtures thereof. Preferred herein are Dobanol R91-2.5, or Lutensol R TO3, or Lutensol R AO3, or Tergitol R 25L3, or Dobanol R 23-3, or Dobanol R 23-2, or Dobanol R 23-10, or mixtures thereof. DobanolR surfactants are commercially available from SHELL. LutensolR surfactants are commercially available from BASF and the Tergitol R surfactants are commercially available from UNION CARBIDE.

Suitable anionic surfactants to be used herein include water soluble salts or acids of the formula $ROSO_3M$ wherein R is preferably a $C_6$–$C_{24}$ hydrocarbyl, preferably an alkyl or hydroxyalkyl having a $C_8$–$C_{20}$ alkyl component, more preferably a $C_8$–$C_{18}$ alkyl or hydroxyalkyl, and M is H or a cation, e.g., an alkali metal cation (e.g., sodium, potassium, lithium), or ammonium or substituted ammonium (e.g., methyl-, dimethyl-, and trimethyl ammonium cations and quaternary ammonium cations, such as tetramethylammonium and dimethyl piperdinium cations and quaternary ammonium cations derived from alkylamines such as ethylamine, diethylamine, triethylamine, and mixtures thereof, and the like).

Other suitable anionic surfactants to be used herein include alkyl-diphenyl-ethersulphonates and alkyl-carboxylates. Other anionic surfactants can include salts (including, for example, sodium, potassium, ammonium, and substituted ammonium salts such as mono-, di- and triethanolamine salts) of soap, $C_9$–$C_{20}$ linear alkylbenzenesulfonates, $C_8$–$C_{22}$ primary or secondary alkanesulfonates, $C_8$–$C_{24}$ olefinsulfonates, sulfonated polycarboxylic acids prepared by sulfonation of the pyrolyzed product of alkaline earth metal citrates, e.g., as described in British patent specification No. 1,082,179, $C_8$–$C_{24}$ alkylpolyglycolethersulfates (containing up to 10 moles of ethylene oxide); alkyl ester sulfonates such as $C_{14\text{-}16}$ methyl ester sulfonates; acyl glycerol sulfonates, fatty oleyl glycerol sulfates, alkyl phenol ethylene oxide ether sulfates, paraffin sulfonates, alkyl phosphates, isethionates such as the acyl isethionates, N-acyl taurates, alkyl succinamates and sulfosuccinates, monoesters of sulfosuccinate (especially saturated and unsaturated $C_{12}$–$C_{18}$ monoesters) diesters of sulfosuccinate (especially saturated and unsaturated $C_6$–$C_{14}$ diesters), acyl sarcosinates, sulfates of alkylpolysaccharides such as the sulfates of alkylpolyglucoside (the nonionic nonsulfated compounds being described below), branched primary alkyl sulfates, alkyl polyethoxy carboxylates such as those of the formula $RO(CH_2CH_2O)_kCH_2COO—M+$ wherein R is a $C_8$–$C_{22}$ alkyl, k is an integer from 0 to 10, and M is a soluble salt-forming cation. Resin acids and hydrogenated resin acids are also suitable, such as rosin, hydrogenated rosin, and resin acids and hydrogenated resin acids present in or derived from tall oil. Further examples are given in "Surface Active Agents and Detergents" (Vol. I and II by Schwartz, Perry and Berch). A variety of such surfactants are also generally disclosed in U.S. Pat. No. 3,929,678, issued Dec. 30, 1975 to Laughlin, et al. at Column 23, line 58 through Column 29, line 23 (herein incorporated by reference).

Preferred anionic surfactants for use herein are the alkyl benzene sulfonates, alkyl sulfates, alkyl alkoxylated sulfates, paraffin sulfonates and mixtures thereof.

The internal disinfecting polar phase according to the present invention has a pH of from 1 to 12, preferably from 3 to 10, and more preferably from 3 to 9. The pH can be adjusted by using alkalinizing agents or acidifying agents. Examples of alkalinizing agents are alkali metal hydroxides, such as potassium and/or sodium hydroxide, or alkali metal oxides such as sodium and/or potassium oxide. Examples of acidifying agents are organic or inorganic acids such as citric or sulfuric acid.

Solvents may be present in the internal disinfecting polar phase according to the present invention. These solvents will, advantageously, give an enhanced cleaning to the disinfecting wipes of the present invention. Suitable solvents for incorporation herein include propylene glycol derivatives such as n-butoxypropanol or n-butoxypropoxypropanol, water-soluble CARBITOL® solvents or water-soluble CELLOSOLVE® solvents. Water-soluble CARBITOL® solvents are compounds of the 2-(2-alkoxyethoxy)ethanol class wherein the alkoxy group is derived from ethyl, propyl or butyl. A preferred water-soluble carbitol is 2-(2-butoxyethoxy)ethanol also known as butyl carbitol. Water-soluble CELLOSOLVE® solvents are compounds of the 2-alkoxyethoxyethanol class, with 2-butoxyethoxyethanol being preferred. Other suitable solvents are benzyl alcohol, methanol, ethanol, isopropyl alcohol and diols such as 2-ethyl-1,3-hexanediol and 2,2,4-trimethyl-1,3-pentanediol and mixture thereof. Preferred solvents for use herein are n-butoxypropoxypropanol, butyl carbitol® and mixtures thereof. A most preferred solvent for use herein is butyl carbitol®.

The internal disinfecting polar phase herein may further comprise other optional ingredients including radical scavengers, chelating agents, thickeners, builders, buffers, stabilizers, bleach activators, soil suspenders, dye transfer agents, brighteners, anti dusting agents, enzymes, dispersant, dye transfer inhibitors, pigments, perfumes, and dyes and the like.

Suitable radical scavengers for use herein include the well-known substituted mono and di hydroxy benzenes and derivatives thereof, alkyl- and aryl carboxylates and mixtures thereof Preferred radical scavengers for use herein include di-tert-butyl hydroxy toluene (BHT), p-hydroxy-toluene, hydroquinone (HQ), di-tert-butyl hydroquinone (DTBHQ), mono-tert-butyl hydroquinone (MTBHQ), tert-butyl-hydroxy anysole, p-hydroxy-anysol, benzoic acid, 2,5-dihydroxy benzoic acid, 2,5-dihydroxyterephtalic acid, toluic acid, catechol, t-butyl catechol, 4-allyl-catechol, 4-acetyl catechol, 2-methoxy-phenol, 2-ethoxyphenol, 2-methoxy-4-(2-propenyl)phenol, 3,4-dihydroxy benzaldehyde, 2,3-dihydroxy benzaldehyde, benzylamine, 1,1,3-tris(2-methyl-4-hydroxy-5-t-butylphenyl) butane, tertbutyl-hydroxy-anyline, p-hydroxy anyline as well as n-propyl-gallate. Highly preferred for use herein is di-tert-butyl hydroxy toluene, which is for example commercially available from SHELL under the trade name IONOL CP®.

Typically, the radical scavenger, or a mixture thereof, is present in the internal water phase up to a level of 5% by weight, preferably from 0.001% to 3% by weight, and more preferably from 0.001% to 1.5%.

Suitable chelating agents to be used herein may be any chelating agent known to those skilled in the art such as the ones selected from the group consisting of phosphonate chelating agents, amino carboxylate chelating agents or other carboxylate chelating agents, or polyfunctionally-substituted aromatic chelating agents and mixtures thereof.

Such phosphonate chelating agents may include etidronic acid (1-hydroxyethylidene-bisphosphonic acid or HEDP) as well as amino phosphonate compounds, including amino alkylene poly (alkylene phosphonate), alkali metal ethane 1-hydroxy diphosphonates, nitrilo trimethylene phosphonates, ethylene diamine tetra methylene phosphonates, and diethylene triamine penta methylene phosphonates. The phosphonate compounds may be present either in their acid form or as salts of different cations on some or all of their acid functionalities. Preferred phosphonate chelating agents to be used herein are diethylene triamine penta methylene phosphonates. Such phosphonate chelating agents are commercially available from Monsanto under the trade name DEQUEST®.

Polyfunctionally-substituted aromatic chelating agents may also be useful herein. See U.S. Pat. No. 3,812,044, issued May 21, 1974, to Connor et al. Preferred compounds of this type in acid form are dihydroxydisulfobenzenes such as 1,2-dihydroxy-3,5-disulfobenzene.

A preferred biodegradable chelating agent for use herein is ethylene diamine N,N'-disuccinic acid, or alkali metal, or alkaline earth, ammonium or substitutes ammonium salts thereof or mixtures thereof. Ethylenediamine N,N'-disuccinic acids, especially the (S,S) isomer have been extensively described in U.S. Pat. No. 4,704,233, Nov. 3, 1987 to Hartman and Perkins. Ethylenediamine N,N'-disuccinic acid is, for instance, commercially available under the tradename ssEDDS® from Palmer Research Laboratories.

Suitable amino carboxylate chelating agents useful herein include ethylene diamine tetra acetate, diethylene triamine pentaacetate, diethylene triamine pentaacetate (DTPA), N-hydroxyethylethylenediamine triacetate, nitrilotri-acetate, ethylenediamine tetraproprionate, triethylenetetraaminehexa-acetate, ethanoldiglycine, propylene diamine tetracetic acid (PDTA) and methyl glycine di-acetic acid (MGDA), both in their acid form, or in their alkali metal, ammonium, and substituted ammonium salt forms. Particularly suitable to be used herein are diethylene triamine penta acetic acid (DTPA), propylene diamine tetracetic acid (PDTA) which is, for instance, commercially available from BASF under the trade name Trilon FS® and methyl glycine di-acetic acid (MGDA).

Further carboxylate chelating agents to be used herein includes malonic acid, salicylic acid, glycine, aspartic acid, glutamic acid, dipicolinic acid and derivatives thereof, or mixtures thereof.

Typically, the chelating agent, or a mixture thereof, is present in the internal polar phase at a level of from 0.001% to 5% by weight, preferably from 0.001% to 3% by weight and more preferably from 0.001% to 1.5%.

The disinfecting wipes according to the present invention are suitable for disinfecting various surfaces including animate surfaces (e.g. human skin) as well as inanimate surfaces including any hard-surfaces.

Regardless of its composition, the internal polar phase will preferably comprise from about 67 to about 92% of the emulsion. Most preferably, the internal polar phase will comprise from about 82 to about 91% of the emulsion.

Where the internal polar phase comprises water as a major component, the internal phase can comprise water-soluble or dispersible materials that do not adversely affect the stability of the high internal phase inverse emulsion. One such material that is typically included in the internal water phase is a water-soluble electrolyte. The dissolved electrolyte minimizes the tendency of materials present in the lipid phase to also dissolve in the water phase. Any electrolyte capable of imparting ionic strength to the water phase can be used. Suitable electrolytes include the water soluble mono-, di-, or trivalent inorganic salts such as the water-soluble halides, e.g., chlorides, nitrates and sulfates of alkali metals and alkaline earth metals. Examples of such electrolytes include sodium chloride, calcium chloride, sodium sulfate, magnesium sulfate, and sodium bicarbonate. The electrolyte will typically be included in a concentration in the range of from about 1 to about 20% of the internal water phase.

Other water-soluble or dispersible materials that can be present in the internal polar phase include thickeners and viscosity modifiers. Suitable thickeners and viscosity modifiers include polyacrylic and hydrophobically modified polyacrylic resins such as Carbopol and Pemulen, starches such as corn starch, potato starch, tapioca, gums such as guar gum, gum arabic, cellulose ethers such as hydroxypropyl cellulose, hydroxyethyl cellulose, carboxymethyl cellulose, and the like. These thickeners and viscosity modifiers will typically be included in a concentration in the range of from about 0.05 to about 0.5% of the internal phase.

Again, where water is a major constituent of the internal polar phase, water-soluble or dispersible materials that can be present in the internal phase include polycationic polymers to provide steric stabilization at the polar phase-lipid phase interface and nonionic polymers that also stabilize the emulsion. Suitable polycationic polymers include Reten 201, Kymene® 557H and Acco 711. Suitable nonionic polymers include polyethylene glycols (PEG) such as Carbowax. These polycationic and nonionic polymers will typically be included in a concentration in the range of from about 0.1 to about 1.0% of the polar phase.

3. Emulsifier

Another key component of the high internal phase inverse emulsion of the present invention is an emulsifier. In the emulsions of the present invention, the emulsifier is included in an effective amount. What constitutes an "effective amount" will depend on a number of factors including the respective amounts of the lipid and internal polar phase components, the type of emulsifier used, the level of impurities present in the emulsifier, and like factors. Typically, the emulsifier comprises from about 1 to about 10% of the emulsion. Preferably, this emulsifier will comprise from about 3 to about 6% of the emulsion. Most preferably, this emulsifier will comprise from about 4 to about 5% of the emulsion. While the singular "emulsifier" is used to describe this component, more than one emulsifier may be used when forming the emulsion. Indeed, as discussed below, it may be desirable to utilize both a primary and a secondary emulsifier when certain materials are employed. Though not intended to limit the scope of the invention, where two emulsifiers are utilized, preferred is where the primary emulsifier comprises from about 1 to about 7%, more preferably from about 2 to about 5%, most preferably from about 2 to about 4%, by weight of the emulsion; and the secondary emulsifier comprises from about 0.5 to about 3%, more preferably from about 0.75 to about 2%, most preferably from about 0.75 to about 1.5%, by weight of the emulsion.

The emulsifier needs to be substantially lipid-soluble or miscible with the lipid phase materials, especially at the temperatures at which the lipid material melts. It also should have a relatively low HLB value. Emulsifiers suitable for use in the present invention have HLB values typically in the range of from about 2 to about 5 and can include mixtures of different emulsifiers. Preferably, these emulsifiers will have HLB values in the range of from about 2.5 to about 3.5.

Emulsifiers suitable for use in the present invention include silicone polymer emulsifiers such as alkyl dimethicone copolyols (e.g., Dow Corning Q2-5200 laurylmethicone copolyol). Such emulsifiers are described in detail in co-pending U.S. patent application No. 08/430,061, filed Apr. 27, 1995 by L. Mackey (Case 5653), which is incorporated by reference herein.

Other suitable emulsifiers are described in co-pending U.S. patent application No. 08/336,456, filed Nov. 9, 1994 by L. Mackey et al. (Case 5478), abandoned, which is incorporated by reference herein. Emulsifiers described therein include certain sorbitan esters, preferably the sorbitan esters of $C_{16}$–$C_{22}$ saturated, unsaturated or branched chain fatty acids. Because of the manner in which they are typically manufactured, these sorbitan esters usually comprise mixtures of mono-, di-, tri-, etc. esters. Representative examples of suitable sorbitan esters include sorbitan monooleate (e.g., SPAN® 80), sorbitan sesquioleate (e.g., Arlacel® 83), sorbitan monoisostearate (e.g., CRILL® 6 made by Croda), sorbitan stearates (e.g., SPAN® 60), sorbitan triooleate (e.g., SPAN® 85), sorbitan tristearate (e.g., SPAN® 65) and sorbitan dipalmitates (e.g., SPAN® 40). Laurylmethicone copolyol is a particularly preferred emulsifier for use in the present invention. Other suitable emulsifiers described therein include certain glyceryl monoesters, preferably glyceryl monoesters of $C_{16}$–$C_{22}$ saturated, unsaturated or branched chain fatty acids such as glyceryl monostearate, glyceryl monopalmitate, and glyceryl monobehenate; certain sucrose fatty acid esters, preferably sucrose esters of the $C_{12}$–$C_{22}$ saturated, unsaturated, and branched chain fatty acids such as sucrose trilaurate and sucrose distearate (e.g., Crodesta® F10), and certain polyglycerol esters of $C_{16}$–$C_{22}$ saturated, unsaturated or branched fatty acids such as diglycerol monooleate and tetraglycerol monooleate. In addition to these primary emulsifiers, coemulsifiers can be used to provide additional water-in-lipid emulsion stability. Suitable coemulsifiers include phosphatidyl cholines and phosphatidyl choline-containing compositions such as the lecithins; long chain $C_{16}$–$C_{22}$ fatty acid salts such as sodium stearate, long chain $C_{16}$–$C_{22}$ dialiphatic, short chain $C_1$–$C_4$ dialiphatic quaternary ammonium salts such as ditallow dimethyl ammonium chloride and ditallow dimethyl ammonium methylsulfate; long chain $C_{16}$–$C_{22}$ dialkoyl(alkenoyl)-2-hydroxyethyl, short chain $C_1$–$C_4$ dialiphatic quaternary ammonium salts such as ditallowoyl-2-hydroxyethyl dimethyl ammonium chloride, the long chain $C_{16}$–$C_{22}$ dialiphatic imidazolinium quaternary ammonium salts such as methyl-1-tallow amido ethyl-2-tallow imidazolinium methylsulfate and methyl-1-oleyl amido ethyl-2-oleyl imidazolinium methylsulfate; short chain $C_1$–$C_4$ dialiphatic, long chain $C_{16}$–$C_{22}$ monoaliphatic benzyl quaternary ammonium salts such as dimethyl stearyl benzyl ammonium chloride, and synthetic phospholipids such as stearamidopropyl PG-dimonium chloride (Phospholipid PTS from Mona Industries). Interfacial tension modifiers such as cetyl and stearyl alcohol for closer packing at the water-lipid interface can also be included.

Preferred emulsifiers useful in making the articles of the present invention include the high viscosity emulsifiers described in co-pending U.S. patent application No. 640,268, filed Apr. 30, 1996 by L. Mackey and B. Hird, abandoned, which is incorporated by reference herein. These emulsifiers preferably have a viscosity at 55° C. of at least about 500 centipoise. (Viscosity can be measured using a Lab-Line Instruments Brookfield-type rotating disc viscometer.) That application describes specifically the use of emulsifiers such as those designated by The Lubrizol Corporation (Wickliffe, Ohio) as OS-122102, OS-121863, OS-121864, OS-80541J and OS-80691J, which are reaction products of (i) a hydrocarbyl-substituted carboxylic acid or anhydride (preferably a polyisobutylene-substituted succinic acid or anhydride); and (ii) an amine or alcohol, to form an ester or amide product. The materials, and methods for their manufacture, are described in U.S. Pat. No. 4,708,753, issued Nov. 24, 1987 to Forsberg [see especially Column 3, lines 32–38; and Column 8, line 10, to Column 26, line 68], and U.S. Pat. No. 4,844,756, issued Jul. 4, 1989 to Forsberg, both of which are incorporated by reference herein.

Other materials believed to be useful in the present invention include hydrocarbon-substituted succinic anhydrides such as those described in U.S. Pat. No. 3,215,707, issued Nov. 2, 1965 to Rense; U.S. Pat. No. 3,231,587, issued Jan. 25, 1996 to Rense; U.S. Pat. No. 5,047,175, issued to Forsberg on Sep. 10, 1991; and World Patent Publication Number WO 87/03613, published by Forsberg on Jun. 18, 1987. These publications are all incorporated by reference herein.

Still other materials useful as the emulsifier, particularly as a co-emulsifier with a high viscosity primary emulsifier, are ABA block copolymers of 12-hydroxystearic acid and polyethylene oxide. Such materials are described in U.S. Pat. No. 4,875,927, issued to T. Tadros on Oct. 24, 1989, which is incorporated by reference herein. A representative material of this class useful as an emulsifier herein is available from Imperial Chemical Industries PLC as Arlacel P135.

While all the above-described materials may be used as a single emulsifier, it may be desired to employ more than one emulsifier when forming the emulsion. In particular, where a high viscosity emulsifier is used, a certain "tacky" feel may result when the treated article is subjected to in-use shear pressures that break the emulsion. In this case, it may be desirable to use a relatively lower viscosity co-emulsifier with the primary emulsifier, to allow use of a lower amount of the main emulsifier, thereby alleviating tackiness. In one preferred embodiment of the present invention, a primary emulsifier available from Lubrizol (i.e., reaction product of polyisobutylene-substituted succinic acid and an amine) and a secondary emulsifier that is an ABA block copolymer of poly-12-hydroxystearic acid and polyethylene oxide (e.g., ICI's Arlacel P135) are used to provide an emulsion with improved water retention levels over time, as well as beneficial reduced tackiness (via reduction in level of primary emulsifier). The skilled artisan will recognize that different desired end-uses will dictate whether multiple emulsifiers are appropriate, and the appropriate relative amounts of each if appropriate. Such a determination will require only routine experimentation by the skilled artisan in view of the present disclosure.

4. Optional Emulsion Components

The high internal phase inverse emulsions of the present invention can also comprise other optional components typically present in moisture containing solutions of this type. These optional components can be present in either the continuous lipid phase or the internal polar phase and include perfumes, antimicrobial (e.g., antibacterial) actives, pharmaceutical actives, deodorants, opacifiers, astringents, skin moisturizers, and the like, as well as mixtures of these components. All of these materials are well known in the art as additives for such formulations and can be employed in effective, appropriate amounts in the emulsions of the present invention. A particularly preferred optional component that is included in the emulsions of wet-like cleansing wipes according to the present invention is glycerin as a skin conditioning agent.

The emulsion component of the articles of the present invention is described and claimed herein in terms of components, and corresponding amounts of the components, that are present after emulsion formation. That is, when the stable emulsion is formed and applied to the carrier. It is understood that the description (components and amounts) of the emulsion also encompasses emulsions formed by combining the described components and levels, regardless of the chemical identity of the components after emulsification and application to the carrier.

C. Other Optional Wipe Components

Besides the high internal phase inverse emulsion, there are other optional components that can be included in the articles of the present invention, typically for the purpose of improving the cleaning performance of the article when the internal polar phase of the emulsion is released. Certain of these optional components cannot be present in the emulsion at significant levels (e.g., greater than 2% of the internal phase) because they can cause premature disruption of the emulsion. These include various anionic detergent surfactants that have relatively high HLB values (e.g., HLBs of from about 10 to about 25), such as sodium linear alkylbenzene sulfonates (LAS) or alkyl ethoxy sulfates (AES), as well as nonionic detergent surfactants such as alkyl ethoxylates, alkyl amine oxides, alkyl polyglycosides, zwitterionic detergent surfactants, ampholytic detergent surfactants, and cationic detergent surfactants such as cetyl trimethyl ammonium salts, and lauryl trimethyl ammonium salts. See U.S. Pat. No. 4,597,898 (Vander Meer), issued Jul. 1, 1986 (herein incorporated by reference), especially columns 12 through 16 for representative anionic, nonionic, zwitterionic, ampholytic and cationic detergent surfactants. Instead, these high HLB detergent surfactants can be applied or included in the article separately from the emulsion. For example, an aqueous solution of these high HLB detergent surfactants can be applied to the carrier either before or after application of the emulsion to the carrier. During wiping, the emulsion is disrupted, releasing the polar phase components so that they can then be combined with the high HLB detergent surfactant to provide improved hard surface cleaning.

Though the description of the invention generally relates to applying a single water-in-lipid emulsion to the carrier, it is recognized that two or more different emulsions may be utilized in preparing a single article. In such embodiments, the emulsions may differ in a variety of ways, including but not limited to, the ratio of the internal polar phase and the external lipid phase, the emulsifiers used, the components used for either or both of the internal and lipid phases, and the like. Utilization of multiple emulsions in one article may be particularly desirable when two or more components are incompatible with each other, but can each be included in a separate emulsion. Alternatively, if a particular reaction is desired at the time of use, the reactants can be provided in separate emulsions. Upon shearing of the emulsions during use, the desired reaction will occur. For example, where foaming is desired during the wiping processes, a mild acid can be incorporated in the internal polar phase of one emulsion, while bicarbonate is incorporated in the internal polar phase of a second emulsion. Upon shearing of the emulsions during use, the reactants interact to provide the desired foam.

D. Preparation of Emulsion Treated Articles

In preparing the articles according to the present invention, the high internal phase emulsion is initially formulated. Typically, this is achieved by blending or melting together the lipid phase components and the emulsifier. The particular temperature to which this lipid/emulsifier mixture is heated will depend on the melting point of the lipid phase components. Typically, this lipid/emulsifier mixture is heated to a temperature in the range from about 50 to about 90° C., preferably from about 70 to about 80° C., prior to being mixed, blended or otherwise combined with the internal polar phase components. The melted lipid/emulsifier mixture is then blended with the internal polar phase components and then mixed together, typically under low shear conditions to provide the emulsion.

This high internal phase inverse emulsion is then applied in a fluid or plastic state at the temperatures indicated above to a carrier that will provide the article with the requisite fluid absorbency rates and absorbent capacity. Any of a variety of methods that apply materials having a fluid or plastic consistency can be used to apply this emulsion. Suitable methods include spraying, printing (e.g., flexographic or screen printing), coating (e.g., gravure coating), extrusion, or combinations of these application techniques, e.g. spraying the detergent surfactant on the paper web, followed by gravure coating of the emulsion on the detergent treated web.

The emulsion can be applied either to one or both surfaces of the carrier, or it can be applied to the inner and/or outer surface(s) of the plies that makes up the carrier. For example, in the case of a two ply carrier, the emulsion can be applied to the inner surface of one or both of the plies, leaving the outside surface of the carrier free of the emulsion. This carrier design minimizes transfer of wax and emulsifier to the surface being cleaned, which is especially desirable when higher loadings of emulsion are used to provide more liquid for cleaning. For example, to provide the level of liquid of a typical wipe for cleaning hard surfaces, a loading of emulsion of five times the weight of the carrier or greater might be used. The application of the emulsion to both sides of the carrier can be either sequential or simultaneous. Once the emulsion has been applied to the substrate, it is allowed to cool and solidify to form a solidified, typically discontinuous coating or film on the surface of the carrier. However, the emulsion can be applied to the carrier such that a continuous or discontinuous coating results.

The emulsion can be applied nonuniformly to the surface (s) of the carrier. By "nonuniform" is meant that the amount, pattern of distribution, etc. of the emulsion can vary over the surface(s) of the material being treated. For example, some portions of the surface of the carrier can have greater or lesser amounts of the emulsion, including portions of the surface that do not have any emulsion (i.e., application results in discontinuous emulsion coating). The high internal phase inverse emulsion can be applied to the carrier at any point after it has been dried. For example, the emulsion can be applied to the carrier after it has been creped from a Yankee dryer. Usually, it is preferred to apply the emulsion to the paper web as it is being unwound from a parent roll and prior to being wound up on smaller, finished product rolls.

In applying high internal phase inverse emulsions to the carriers, spray and gravure coating methods are usually preferred. FIG. 1 illustrates one such preferred method where the emulsion is sprayed onto a carrier 10. Referring to FIG. 1, this spray system has a spray head 12 that applies a dispersed spray 14 of the emulsion onto carrier 10.

This spray system is actuated by an assembly that consists of a ball screw drive 16 that is connected by coupling 18 to a piston 26 of hydraulic cylinder 22. A portion of cylinder 22 is shown in FIG. 1 as being filled with the high internal phase inverse emulsion as indicated by 30. Cylinder 22 is heated to keep emulsion 30 in a fluid or plastic state. Emulsion 30 enters cylinder 22 via a 4-way coupling 34 that has a line 38 connected to a heated filling port 42. Coupling 34 also has a line 46 that is connected to pressure gauge 50 and spray head 12. There are three valves indicated as 56, 58 and 60 that control the flow of the emulsion in lines 38 and 46. The spray system shown in FIG. 1 also has a line 64 connected to spray head 12 that allows air indicated generally as 68 to be admitted to the spray head. Line 64 also has a pressure gauge and regulator 72 for controlling and measuring the air pressure in line. Lines 64 and 46 are heated to maintain the emulsion in a molten state prior to application to the carrier.

To fill cylinder 22 with emulsion 30, valves 56 and 60 are closed and valve 58 is 30 opened. Ball screw drive 16 is actuated so that piston 26 moves to the left. The vacuum created in cylinder 22 draws the emulsion from filling port 42 through line 38 and into cylinder 22. To provide emulsion from cylinder 22 to spray head 12, valve 58 is closed and valves 56 and 60 are opened. The ball screw drive 16 is actuated so that piston 26 moves to the right. This forces emulsion 30 out of cylinder 22 and into line 46 of coupling 34. The 35 emulsion then passes through valve 60 and into the spray head 12 where it is dispersed by incorporation of air from line 64 to provide dispersed spray 14 that is then applied to carrier 10.

Figure 2:
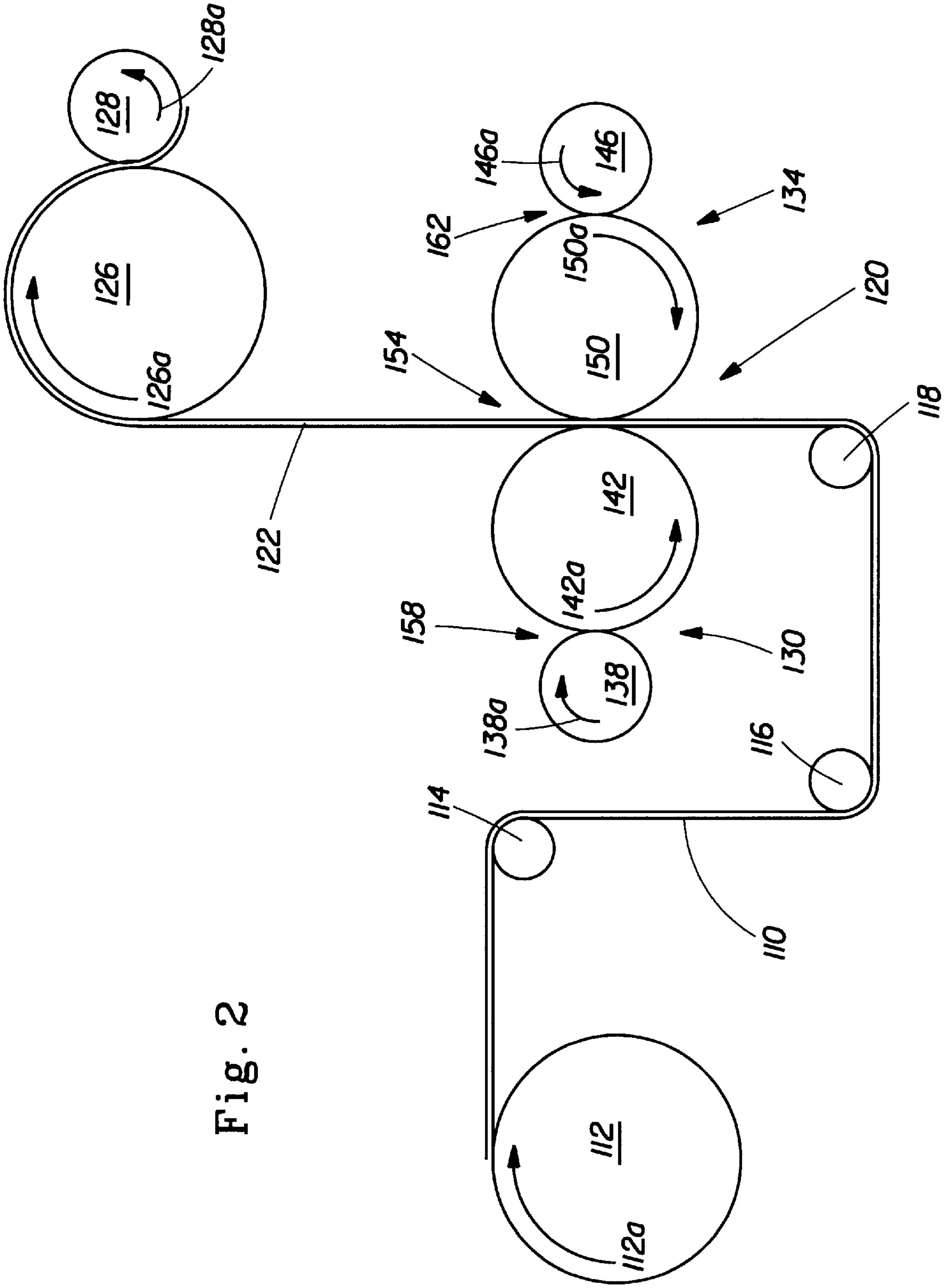
FIG. 2 is a schematic representation illustrating a system for applying the high internal phase inverse emulsions of the present invention by gravure coating to a carrier such as a treated paper web.
Figure 3:
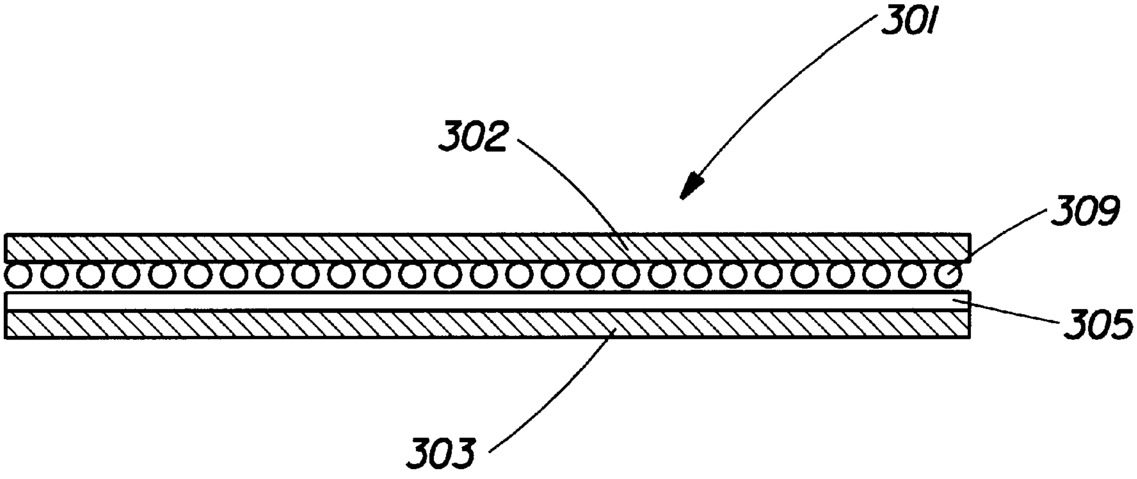
FIG. 3 is a cross-sectional view of an article of the present invention. Article 301 comprises a fluid impermeable layer 305 which is a film formed from a material that is soluble in the internal polar phase components. For example, in preferred embodiments where the internal phase comprises significant levels of water, film layer 305 is a watersoluble material, such as polyvinylalcohol or methylhydroxypropyl cellulose. Fluid impermeable layer 305 is positioned between surface contacting hydrophobic layer 302 (preferably a nonwoven material rendered wettable by, e.g., surfactant treatment) and a hydrophilic layer 303. The internal surface of fluid impermeable layer 302 is treated with emulsion 309, such that the emulsion is located between hydrophobic layer 302 and fluid impermeable film layer 305. The other side of layer 305 is attached to hydrophilic substrate 303. In this embodiment, in-use pressures cause emulsion 309 to break, thereby releasing the internal water phase components, which are allowed to penetrate through hydrophobic layer 302 to the surface being cleaned. Fluid impermeable layer 305 initially prevents the water phase components from penetrating hydrophilic layer 303, allowing the emulsion's internal phase components to interact with soils, etc. on the surface. However, as fluid impermeable layer 305 is solubilized by the released water phase components, hydrophilic layer 303 becomes accessible to the fluid and contributes to the carrier's absorption of the water phase components and solubilized soils.
Figure 4:
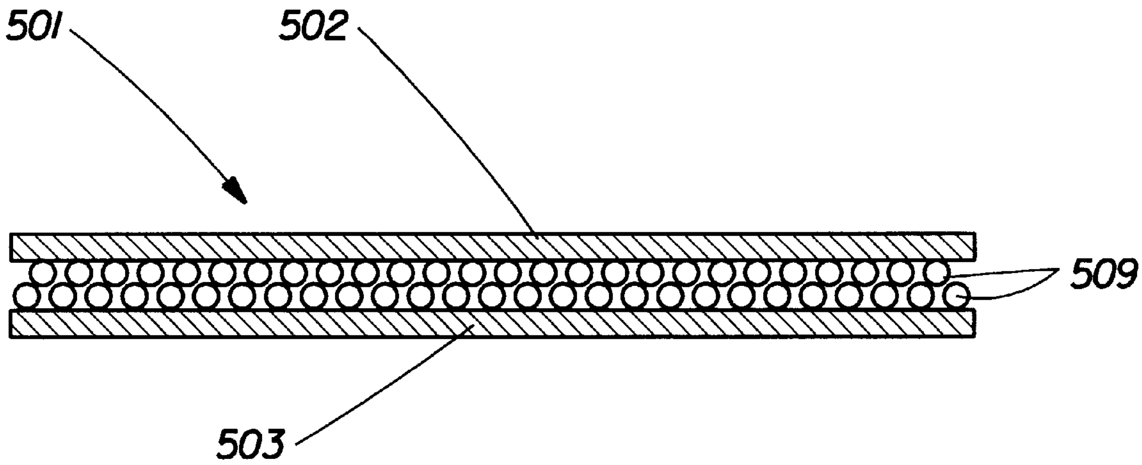
FIG. 4 is a cross-sectional view of another article of the present invention where the internal phase of the emulsion comprises a significant level of water. In this embodiment, article 501 is depicted as a two-ply article with emulsion 509 located between the layers 502 and 503. Layers 502 and 503 may be formed from essentially the same material, and are each hydrophilic materials (e.g., wet-laid tissue substrates) that are rendered temporarily hydrophobic by treatment with a hydrophobic fatty acid (e.g., stearic acid). The internal phase of emulsion 509 comprises a high pH buffer to neutralize the fatty acid upon release of the internal phase during use by a consumer, resulting in layers 502 and 503 becoming hydrophilic. As such, while layers 502 and 503 are initially hydrophobic to allow for dwell time of the released internal phase of emulsion 509, both layers become increasingly hydrophilic during the wiping process to allow absorption of that released internal phase.

FIG. 2 illustrates an alternative method for applying the high internal phase inverse emulsion involving a flexible rotogravure coating system. Referring to FIG. 2, a carrier 110 is unwound from parent tissue roll 112 (rotating in the direction indicated by arrow **112*a*) and advanced around turning rolls 114, 116 and 118. From turning roll 118, carrier 110 is advanced to a gravure coating station indicated generally as 120 where the emulsion is then applied to both sides of the carrier. After leaving station 120, carrier 110 becomes a treated web indicated by 122. Treated web 122 is advanced to surface rewinder roll 126 (rotating in the direction indicated by arrow 126*a*) and then wound up on finished product roll 128 (rotating in the direction indicated by arrow 128*a***).

Station 120 comprises a pair of heated linked gravure presses 130 and 134. Press 130 consists of a smaller anilox cylinder 138 and a larger print plate cylinder 142; press 134 similarly consists of a smaller anilox cylinder 146 and a larger print plate cylinder 150. Anilox cylinders 138 and 146 each have a ceramic or chrome surface, while print plate cylinders 142 and 150 each have a relief patterned rubber, urethane, or photopolymer surface. These anilox and print plate cylinders rotate in the directions indicated by arrows **138*a*, 142*a*, 146*a* and 150*a*, respectively. As shown in FIG. 2, print plate cylinders 142 and 150 are opposed to one another and provide a nip area indicated by 154 through which carrier 110** passes.

Hot, molten (e.g., 60° C.) emulsion is pumped to or sprayed onto each of these linked gravure presses 130 and 134 at the nip areas indicated by arrows 158 and 162, respectively, at a constant volumetric flow rate. (Emulsion delivered to presses 130 and 134 may be the same or different.) In other words, the emulsion is added to the linked gravure presses 130 and 134 at the same rate as the emulsion is being applied to the carrier 110. This eliminates emulsion "build-up" in the system. As anilox cylinders 138 and 146 rotate in the directions indicated by arrows **138*a* and 146*a*, they act as rotating doctor blades to spread the emulsion evenly across the surfaces of print plate cylinders 142 and 150, respectively, and to remove excess emulsion from the print plates of cylinders 142 and 150**.

The emulsion that is spread onto print plate cylinders 142 and 150 (rotating in the opposite direction as indicated by arrows **142*a* and 150*b*) is then transferred to both sides of carrier 110 at nip area 154. The amount of the emulsion transferred to carrier 110 can be controlled by: (1) adjusting the width of nip area 154 between print plate cylinders 142 and 150; (2) adjusting the width of nip areas 158 and 162 between anilox/print plate cylinder pairs 138/142 and 146/150; (3) the print image relief (i.e., valley depth) of the print plate on cylinders 142 and 150; (4) the print area (i.e., valley area) of the print plate on cylinders 142 and 150; and/or (5) the print pattern of the print plate on cylinders 142 and 150**.

E. Test Methods

1. Horizontal Full Sheet

The Horizontal Full Sheet (HFS) test method determines the amount of distilled water absorbed and retained by an article of the present invention. This quantity of water is reported as a function of the dry carrier weight. This method is performed by first weighing the article (i.e., carrier treated with emulsion) (referred to herein as the "Dry Weight of the article"), then thoroughly wetting the article, draining the wetted article in a horizontal position and then reweighing (referred to herein as "Wet Weight of the article"). Finally, the wetted article is dried and emulsion is removed, leaving the carrier. The dry weight of the carrier is then determined (referred to herein as the "Dry Weight of the Carrier"). The absorptive capacity of the article is then computed as the amount of water retained in units of grams of water absorbed by the article per gram of dry carrier.

The apparatus for determining the HFS capacity of an article comprises the following: An electronic balance with a sensitivity of at least ±0.01 grams and a minimum capacity of 1200 grams. The balance should be positioned on a balance table and slab to minimize the vibration effects of floor/benchtop weighing. The balance should also have a special balance pan to be able to handle the size of the article tested (about 12 in. by 12 in.). The balance pan can be made out of a variety of materials. Plexiglass is a common material used. A sample support rack and sample support cover is also required. Both the rack and cover are comprised of a lightweight metal frame, strung with 0.012 in. diameter monofilament so as to form a grid of 0.5 inch squares. The size of the support rack and cover is such that the sample size can be conveniently placed between the two, typically 12 in. by 12 in.

The HFS test is performed in an environment maintained at 73±2 F and 50±2% relative humidity. A water reservoir or tub is filled with distilled water at 73±2 F to a depth of 3 inches.

The article to be tested is carefully weighed on the balance to the nearest 0.01 grams. The dry weight of the sample is reported to the nearest 0.01 grams. The empty sample support rack is placed on the balance with the special balance pan described above. The balance is then zeroed (tared). The sample article (carrier treated with emulsion) is carefully placed on the sample support rack. The support rack cover is placed on top of the support rack. The sample article (now sandwiched between the rack and cover) is submerged in the water reservoir. After the sample has been submerged for 60 seconds, the sample support rack and cover is gently raised out of the reservoir. The sample article, support rack and cover are allowed to drain horizontally for 120±5 seconds, taking care not to excessively shake or vibrate the sample article. Next, the rack cover is carefully removed and the wet sample article and the support rack are weighed on the previously tared balance. The weight is recorded to the nearest 0.01 g. This is the wet weight of the article.

The gram per gram absorptive capacity of the article is defined as (Wet Weight of the article—Dry Weight of the article)/(Dry Weight of the carrier). To obtain the dry weight of the carrier (i.e., not treated with emulsion), the emulsion can be removed from the carrier using methods known in the art, such as extraction.

2. Horizontal Gravimetric Wicking

Figure 5:
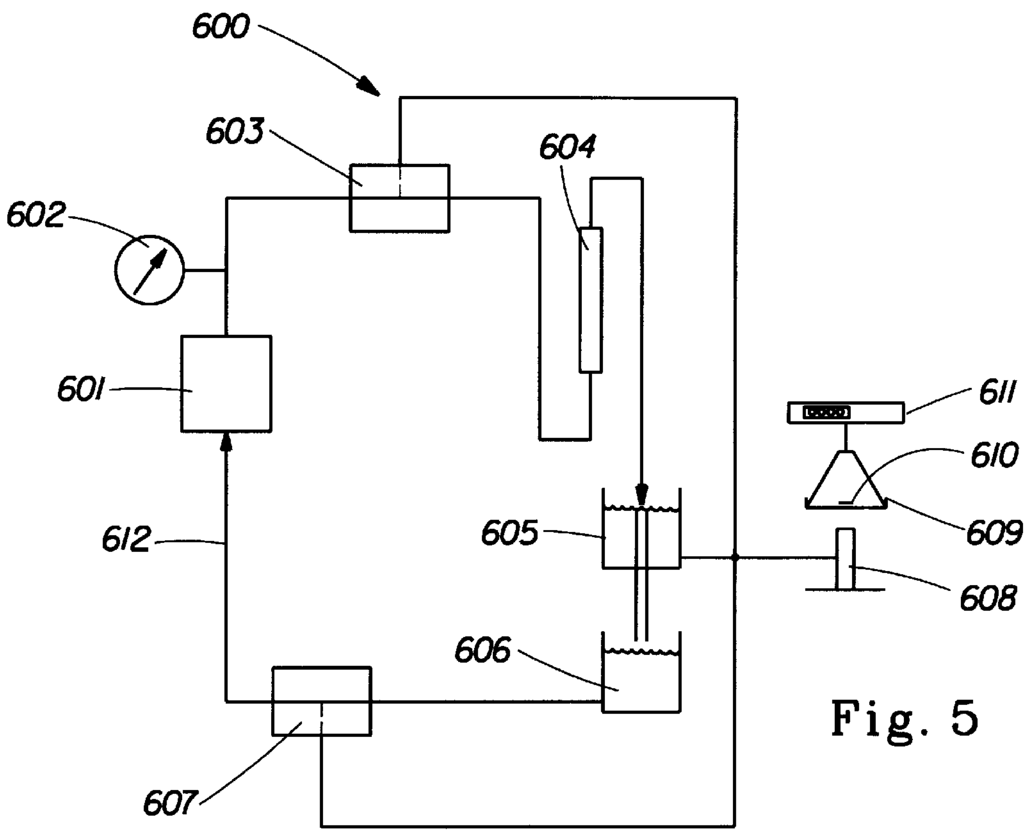
FIG. 5 is a schematic illustration of an instrument for measuring an article's Horizontal Gravimetric Wicking rate.

Horizontal Gravimetric Wicking (HGW) is an absorbency rate test that measures the quantity of water taken up by an absorbent article in a two second time period. The value is reported in grams of water per second divided by grams of sample carrier weight. An instrument for carrying out the HGW method is depicted in FIG. 5 as device 600. The instrument comprises a pump 601, pressure gauge 602, inlet shunt 603, rotometer 604, reservoir 605, sump 606, outlet shunt 607, water supply tube 608, sample holder 609, sample 610, balance 611, and tubing 612.

Figure 6:
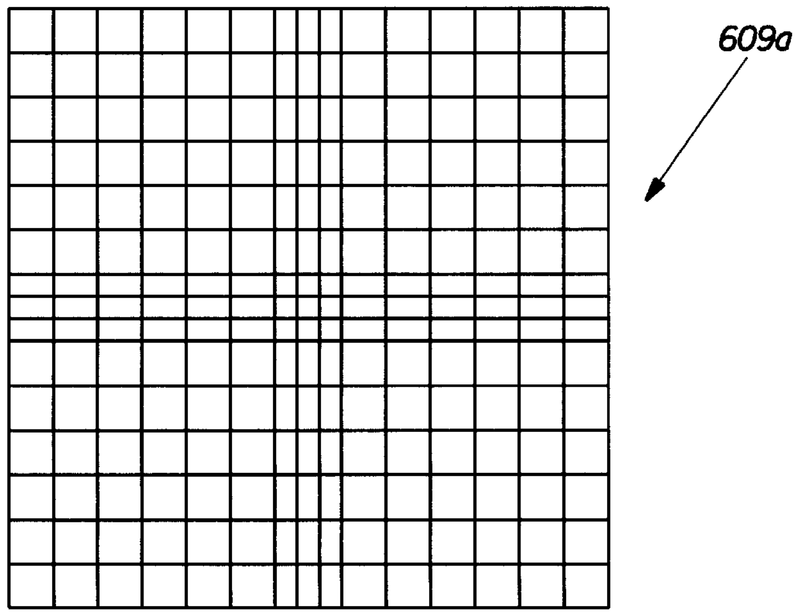
FIG. 6 is a schematic illustration of a sample holder grid used in the Horizontal Gravimetric Wicking method.

In this method, the sample 610 (cut using a 3" diameter cutting die) is placed horizontally in holder 609 suspended from an electronic balance 611. The holder 609 is made up of a lightweight frame measuring approximately 7 in. by 7 in., with lightweight nylon monofilament strung through the frame to form a grid of 0.5 in. squares. (The grid pattern of holder 609 is depicted as 609*a* in FIG. 6.) The nylon monofilament for stringing the support rack should be 0.069±0.005 in. in diameter (e.g., Berkley Trilene Line 2 lb test clear). The electronic balance 611 used should be capable of measuring to the nearest 0.001 g. (e.g., Sartorious L420P+).

The sample in the holder is centered above a water supply tube 608. The water supply is a plastic tube having a 0.312 inch inside diameter containing distilled water at 730°±2° F. The supply tube is connected to fluid reservoir 605 at zero hydrostatic head relative to test sample 610. The water supply tube is connected to the reservoir using plastic (e.g. Tygon®) tubing. The height of the nylon monofilament of the sample holder is located 0.125 in.±1/64 in. above the top of the water supply tube. The water height in the reservoir 605 should be level with the top of the water supply tube 608. The water in the reservoir is continuously circulated using a water pump circulation rate of 85–93 ml/second using water pump 601 (e.g., Cole-Palmer Masterflex 7518-02) with #6409-15 plastic tubing 612. Circulation rate is measured by a rotometer tube 604 (e.g., Cole-Palmer N092-04 having stainless steel valves and float). This crculation rate through the rotometer creates a head pressure of 2.5±0.5 psi as measured by an Ashcroft glycerine filled gauge 602.

Before conducting this measurement, samples should be conditioned to 73°±2° F. and 50±2% Relative Humidity for 2 hours. The HGW test is also performed in these controlled environmental conditions.

To start the absorbent rate measurement the 3 in. sample is placed on the sample holder. Its weight is recorded in 1 second intervals for a total of 5 seconds. The weight is averaged (herein referred to as "Average Sample Dry Weight"). Next, the circulating water is shunted to the sample water supply 608 for 0.5 seconds by shunting through valve 603. The weight reading on the electronic balance 611 is monitored. When the weight begins to increase from zero a stop watch is started. At 2.0 seconds the sample water supply is shunted to the inlet of circulating pump 601 to break contact between the sample and water in the supply tube. The shunt is performed by diverting through valve 607. The minimum shunt time is at least 5 seconds The weight of the sample and absorbed water is recorded to the nearest 0.001 g. at time equals 11.0, 12.0, 13.0, 14.0 and 15.0 seconds. The five measurements are averaged and recorded as "Average Sample Wet Weight".

The increase in weight of the sample as a result of water being absorbed from the tube to the sample is used to determine the absorbency rate. The dry weight of the carrier (i.e., not treated with emulsion) (referred to herein as "Sample Dry Carrier Weight") is obtained by removing the emulsion via any known method, such as extraction. In this case, the rate (grams of water per gram of carrier per second) is calculated as:

[(Average Sample Wet Weight–Average Sample Dry Weight)/ Sample Dry Carrier Weight]/2

It is understood by one skilled in the art that the timing, pulsing sequences and electronic weight measurement can be computer automated.

Representative samples of the two sides of the article are tested using the HGW method. The lower of the two absorbency rates characterizes the article.

F. Specific Illustrations of the Preparation of Wet-Like Cleaning Wipes According to the Present Invention The following are specific illustrations of the preparation of wet-like cleaning wipes in accordance with the present invention.

EXAMPLE I

This example illustrates the preparation of an article comprising an emulsion applied to a paper substrate with a delayed absorptive feature via addition of an amino silicone to the wet end of the papermaking process. The emulsion is added to either or both sides of the carrier (substrate).

A) Carrier Preparation

The carrier is a conventional tissue/towel paper substrate. The base paper is a 100% NSK, non-layered sheet with a basis weight of 20 lbs/ream. In the wet end of the conventional papermaking process, a 2% amino-silicone (available from General Electric as CM 22666D1) is injected into the NSK pulp slurry at a ratio of 0.004 lbs. of amino silicone solids per pound of dry paper and 1% (20 pounds per ton) of Kymene 557H. The substrate is then formed, dried and creped in a conventional manner and is then ready for emulsion addition, and will provide the desired absorbency rate.

B) Emulsion Preparation

An emulsion having 86.5% internal polar phase (consisting primarily of water) is prepared from the ingredients shown in Table I.

TABLE I

| | Amount (gm) | Percentage |
|---|---|---|
| Lipid Phase Ingredients: | | |
| Strahl & Pitsch SP983 | 240 | 8.0 |
| Petrolatum | 60 | 2.0 |
| ICI Americas CP1196 | 15 | 0.5 |
| Dow Q2-5200 | 90 | 3.0 |
| Polar Phase Ingredients: | | |
| Distilled Water | 230.3 | 76.7 |
| HEDP | 0.6 | 0.02 |
| Hydrogen Peroxide | 20.7 | 0.69 |
| Ethanol | 259.9 | 8.65 |
| C-12 Amine Oxide | 5.1 | 0.17 |
| Geraniol | 3.9 | 0.13 |
| Limonene | 1.8 | 0.06 |
| Eukalyptol | 1.8 | 0.06 |

To formulate the internal polar phase, all polar phase components are mixed together and then heated to 140° F. (45.8° C.). Separately, the lipid phase ingredients are heated, with mixing, to a temperature of about 140° F until melted. The polar and lipid phase components are then combined in a stainless steel vessel and mixed with a Hobart Model 100-C mixer on the low speed setting while allowing the ingredients to cool slowly. Mixing is continued until the emulsion forms. Emulsion formation is evidenced by an increase in viscosity above 2000 centipoise as measured with a Lab-Line Instruments rotating disc viscometer.

C) Applying Emulsion to Carrier

The emulsion prepared in step B is applied to the carrier using a rotogravure printing process essentially the same as that shown in FIG. 2, except that only one gravure press (130) is utilized. (Also, rewinder roll 126 is not utilized in preparing the article described by this example.) The emulsion is heated to a temperature of 135° F. so that it is fluid or molten. A positive displacement pump moves the emulsion to the gravure press 130 at the nip area indicated by arrow 158 at a constant volumetric flow rate of 380 ml/minute. Anilox cylinder 138 spreads the emulsion evenly across the surface of the print cylinder 142 (rotating at about 40 feet per minute). Cylinder 142 then transfers the emulsion to one side of web 110 (cylinder 150 is used at a back-up cylinder to maintain constant impression on web 110). The coated carrier 122 is then perforated, folded and sealed (apparatus for performing these functions is not depicted in FIG. 2) to yield finished product wipe. After folding and sealing, the emulsion coats both internal sides of the wipe at about 700% add-on, by dry weight of the carrier, to provide an article of the present invention.

EXAMPLE II

This example illustrates preparation of an article having temporary hydrophobicity where the substrate is treated with a hydrophobic fatty acid and the emulsion internal phase contains a high pH buffer to neutralize the fatty acid upon release of the internal phase during use by a consumer.

A) Carrier Preparation

Stearic acid is heated to a temperature above its melting point (~69° C.) in a PAM600 Spraymatic spray gun (Fastening Technology, Inc.). The stearic acid is sprayed as a fine mist uniformly onto a dry wet-laid paper substrate at a level of 1% by weight of the dry substrate.

B) Emulsion Preparation

An emulsion (88% internal phase) is prepared from the ingredients shown in Table

TABLE II

| | Amount (gm) | Percentage |
|---|---|---|
| Lipid Phase Ingredients: | | |
| Yellow Ceresine Wax (Strahl & Pitsch SP983) | 350 | 7% |
| Petrolatum (Fisher) | 50 | 1% |
| Dow Corning Q2-5200 emulsifier | 150 | 3% |
| Arlacel P-135 emulsifier from ICI | 50 | 1% |
| Polar Phase Ingredients: | | |
| Sodium Carbonate (anhydrous) | 25 | 0.5% |
| Dantogard (preservative from Lonza) | 25 | 0.5% |
| Propylene Glycol | 500 | 10% |
| Distilled Water | 4300 | 77% |

In formulating the polar phase component, the Dantogard, sodium carbonate and propylene glycol are added to the distilled water and then heated to 160° F. (71.1° C.). Separately, the lipid phase ingredients (Yellow ceresine wax, petrolatum, emulsifier Dow Corning Q2-5200 and emulsifier Arlacel P-135) are heated, with mixing, to a temperature of about 170° F. (77° C.) until melted. The polar and lipid phase components are then combined in a stainless steel vessel and mixed with a Hobart Model 100 C mixer on the low speed setting while allowing the ingredients to cool slowly. Mixing is continued until the emulsion forms. Emulsion formation is evidenced by an increase in viscosity above 2000 centipoise as measured with a Lab-Line Instruments rotating disc viscometer.

C) Applying Emulsion to the Carrier

The emulsion prepared in section B is heated in a PAM600 spray gun to a temperature of 60° C. Using a 0.7 mm spray nozzle, the emulsion is extruded as a continuous bead fairly uniformly onto the carrier prepared in section A at a level of 2 grams of emulsion per gram of substrate. While the emulsion is still hot, a second ply of substrate is placed onto the emulsion to form a 2-ply article with the emulsion between the plies.

EXAMPLE III

This example illustrates preparation of an article having temporary hydrophobicity where the substrate is treated with a quaternized amine diester material having the formula:

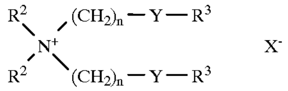

wherein each $R^2$ is methyl, each $R^3$ is a mixture of saturated and mono-, di- and triunsaturated $C_{15}$–$C_{17}$ hydrocarbons, each Y is —O—C(O)—, each n is 2, and $X^-$ is methyl sulfate; and the emulsion's internal phase contains a high pH buffer to hydrolyze this diester material upon release of the internal phase during use by a consumer.

A) Carrier Preparation

The quaternized amine diester is heated to a temperature above its melting point (~130° C.) in a PAM600 Spraymatic spray gun (Fastening Technology, Inc.). The quatemized amine diester is sprayed as a fine mist uniformly onto a wet-laid paper substrate at a level of 1% by weight of the dry substrate.

B) Emulsion Preparation

An emulsion (88.5% internal phase) is prepared from the ingredients shown in Table III.

TABLE III

| | Amount (gm) | Percentage |
|---|---|---|
| Lipid Phase Ingredients: | | |
| Yellow Ceresine Wax (Strahl & Pitsch SP983) | 350 | 7% |
| Petrolatum (Fisher) | 50 | 1% |
| Dow Corning Q2-5200 emulsifier | 150 | 3% |
| Arlacel P-135 emulsifier from ICI | 25 | 0.5% |
| Polar Phase Ingredients: | | |
| Sodium Carbonate (anhydrous) | 25 | 0.5% |
| Dantogard (preservative from Lonza) | 25 | 0.5% |
| Denatured ethanol (3A from VRW Scientific) | 2000 | 40% |
| Distilled Water | 2375 | 47.5% |

In formulating the polar phase component, the Dantogard, sodium carbonate and ethanol are added to the distilled water and then heated to 160° F. (71.1° C.). Separately, the lipid phase ingredients (Yellow ceresine wax, petrolatum, emulsifier Dow Corning Q2-5200 and emulsifier Arlacel P-135) are heated, with mixing, to a temperature of about 170° F. (77° C.) until melted. The polar and lipid phase components are then combined in a stainless steel vessel and mixed with a Hobart Model 100 C mixer on the low speed setting while allowing the ingredients to cool slowly. Mixing is continued until the emulsion forms. Emulsion formation is evidenced by an increase in viscosity above 2000 centipoise as measured with a Lab-Line Instruments rotating disc viscometer.

C) Applying Emulsion to the Substrate

The emulsion prepared in section B is heated in a PAM600 spray gun to a temperature of 60° C. Using a 0.7 mm spray nozzle, the emulsion is extruded as a continuous bead fairly uniformly onto the substrate formed in section A at a level of 2 grams of emulsion per gram of substrate. While the emulsion is still hot, a second ply of substrate is placed onto the emulsion to form a 2 ply article with the emulsion between the plies.

EXAMPLE IV

This Example illustrates a multi-ply wipe that comprises a polarphobic film material that degrades upon exposure to the released internal phase components, to allow absorbency by the entire article. In this Example, the internal polar phase of the emulsion comprises significant levels of water. As such, the film is a hydrophobic material.

The carrier consists of one outer ply of a hydrophobic material, such as a non-woven polyester. This hydrophobic ply is treated on its inside surface with the emulsion prepared in Example III. A second outer ply is comprised of hydrophilic material, such as a wet laid cellulose substrate. A cold water soluble film, such as polyvinyl alcohol (PVOH), is positioned between the hydrophilic ply and the emulsion. The wipe would be used with the hydrophobic ply against the surface upon which the water-in-lipid emulsion active is to be applied. Upon activation the active would be released from the emulsion through the hydrophobic ply. During the wiping process the cold water soluble film would be solubilized, exposing the hydrophilic ply. The hydrophilic ply would then provide a means of absorbing the liquid active back from the cleaned surface.

What is claimed is:

1. An article, which comprises:

a. a carrier; and b. an emulsion applied to the carrier, the emulsion comprising:

(1) from about 2 to about 60% of a continuous, solidified lipid phase comprising a waxy lipid material having a melting point of about 30° C. or higher;

(2) from about 39 to about 97% of an internal polar phase dispersed in the lipid phase; and (3) an effective amount of an emulsifier capable of forming the emulsion when the lipid phase is in a fluid state;

c. wherein the article has a rate of absorbency of distilled water of not more than about 0.35 gram per gram of carrier per second.

2. The article of claim 1 wherein the article has a rate of absorbency of distilled water of not more than about 0.25 gram per gram of carrier per second.

3. The article of claim 2 wherein the article has a rate of absorbency of distilled water of from about 0.05 to about 0.17 gram per gram of carrier per second.

4. The article of claim 1 wherein the article has an absorbent capacity of at least about 1 gram of distilled water per gram of carrier.

5. The article of claim 4 wherein the article has an absorbent capacity of at least about 5 gram of distilled water per gram of carrier.

6. The article of claim 5 wherein the article has an absorbent capacity of at least about 15 gram of distilled water per gram of carrier.

7. The article of claim 1 wherein the emulsion comprises from about 5 to about 30% lipid phase and from about 67 to about 92% polar phase.

8. The article of claim 7 wherein the emulsion comprises from about 6 to about 15% lipid phase and from about 82 to about 91% polar phase.

9. The article of claim 1 wherein the emulsion's internal polar phase comprises at least 60% water.

10. The article of claim 9 wherein the emulsion's internal polar phase comprises at least 75% water.

11. The article of claim 1 wherein the waxy lipid material has a melting point in the range of from about 40° to about 80° C.

12. The article of claim 11 wherein the waxy lipid material has a melting point in the range of from about 60° to about 70° C.

13. The article of claim 1 wherein the waxy lipid material is selected from the group consisting of animal waxes, vegetable waxes, mineral waxes, synthetic waxes and mixtures thereof.

14. The article of claim 13 wherein the waxy lipid material is selected from the group consisting of beeswax, lanolin, candelilla, petrolatum, microcrystalline wax, yellow ceresine wax, white ozokerite, polyethylene waxes, and mixtures thereof.

15. The article of claim 1 wherein the emulsion further comprises a component selected from the group consisting of perfumes, antimicrobials, detersive surfactants, pharmaceutical actives, deodorants, opacifiers, astringents, insect repellents, bleaches, radical scavengers, chelating agents, thickeners, builders, buffers, stabilizers, bleach activators, soil suspenders, dye transfer agents, brighteners, anti dusting agents, enzymes, dispersants, dye transfer inhibitors, pigments, dyes, and mixtures thereof.

16. The article of claim 15 wherein the emulsion comprises a component selected from the group consisting of antimicrobials, detersive surfactants, bleaches, and mixtures thereof.

17. The article of claim 1 wherein the carrier comprises cellulosic fibers.

18. The article of claim 17 wherein the carrier further comprises a material selected from the group consisting of a fluid impermeable, polar-soluble film; a sizing agent; a hydrophobic ester or amide; a fatty acid; and mixtures thereof.

19. The article of claim 18 wherein the carrier comprises an amino-silicone sizing agent at a level of from about 250 to about 1000 parts per million, based on the total weight of the carrier.

20. The article of claim 1 wherein at least two different emulsions are applied to said carrier.

21. An article, which comprises:

a. a carrier; and b. an emulsion applied to the carrier, the emulsion comprising:

(1) from about 5 to about 30% of a continuous, solidified lipid phase comprising a waxy lipid material having a melting point of from about 40° to about 80° C.;

(2) from about 67 to about 92% of an internal polar phase dispersed in the lipid phase, the internal polar phase comprising at least 75% water; and (3) an effective amount of an emulsifier capable of forming the emulsion when the lipid phase is in a fluid state;

c. wherein the article has a rate of absorbency of distilled water of from about 0.05 to about 0.25 gram per gram of carrier per second.

22. The article of claim 21 wherein the article has an absorbent capacity of at least about 5 gram of distilled water per gram of carrier.

23. An article, which comprises:

a. a carrier; and b. an emulsion having a continuous external lipid phase and a dispersed polar internal phase applied to the carrier;

wherein the article has a rate of absorbency of distilled water of not more than about 0.35 gram per gram of carrier per second, and wherein further the emulsion is prepared by combining at least the following materials:

(1) from about 2 to about 60% of a waxy lipid material having a melting point of about 30° C. or higher;

(2) from about 39 to about 97% of a polar material; and (3) an effective amount of an emulsifier capable of forming the emulsion when the waxy lipid is in a fluid state;

where the weight percent for each of components (1), (2) and (3) is determined from the amount combined relative to the total weight of the emulsion.

24. An article, which comprises:

a. a carrier; and b. an emulsion applied to the carrier, the emulsion comprising:

(1) from about 2 to about 60% of a continuous, solidified lipid phase comprising a waxy lipid material having a melting point of about 30° C. or higher;

(2) from about 39 to about 97% of an internal polar phase dispersed in the lipid phase; and (3) an effective amount of an emulsifier capable of forming the emulsion when the lipid phase is in a fluid state;

wherein the carrier comprises a material selected from the group consisting of a fluid impermeable, polar-soluble film; a sizing agent; a hydrophobic ester or amide; a fatty acid; and mixtures thereof.

25. The article of claim 24 wherein the emulsion comprises from about 5 to about 30% lipid phase and from about 67 to about 92% polar phase.

26. The article of claim 24 wherein the emulsion's internal polar phase comprises at least 75% water.

27. The article of claim 24 wherein the waxy lipid material has a melting point in the range of from about 40° to about 80° C.

28. The article of claim 24 wherein the waxy lipid material is selected from the group consisting of animal waxes, vegetable waxes, mineral waxes, synthetic waxes and mixtures thereof.

29. The article of claim 24 wherein the emulsion further comprises a component selected from the group consisting of perfumes, antimicrobials, detersive surfactants, pharmaceutical actives, deodorants, opacifiers, astringents, insect repellents, bleaches, radical scavengers, chelating agents, thickeners, builders, buffers, stabilizers, bleach activators, soil suspenders, dye transfer agents, brighteners, anti dusting agents, enzymes, dispersants, dye transfer inhibitors, pigments, dyes, and mixtures thereof.

30. The article of claim 24 wherein the carrier comprises a fluid impermeable film derived from a material selected from the group consisting of polyvinyl alcohol, polyethylene glycol, and polyvinylpyrrolidone.

31. The article of claim 24 wherein the carrier comprises a hydrophobic ester or amide.

32. The article of claim 31 wherein the carrier comprises an ester-functional ammonium compound.

33. A process for making the article of claim 1, the process comprising:

A. forming an emulsion comprising:

(1) from about 2 to about 60% of a continuous external lipid phase comprising a waxy lipid material having a melting point of about 30° C. or higher;

(2) from about 39 to about 97% of an internal polar phase dispersed in the external lipid phase; and (3) an effective amount of an emulsifier capable of forming the emulsion when the external lipid phase is in a fluid state;

B. applying the emulsion to a carrier at a temperature sufficiently high such that the external lipid phase has a fluid or plastic consistency; and C. cooling the applied emulsion to a temperature sufficiently low such that the external lipid phase solidifies.

34. The process of claim 33 wherein the emulsion is applied to the carrier at temperature in the range from about 60° to about 90° C.

35. The process of claim 34 wherein the emulsion is applied to the carrier at temperature in the range from 70° to about 80° C.

36. The process of claim 33 wherein the emulsion is applied to the carrier by a step selected from the group consisting of spraying, printing, coating, extruding, and combinations thereof.

37. The process of claim 36 wherein the emulsion is applied to the carrier by a step selected from the group consisting of rotogravure coating and printing.

* * * * *

UNITED STATES PATENT AND TRADEMARK OFFICE

CERTIFICATE OF CORRECTION

PATENT NO. : 5,908,707

DATED : June 1, 1999

INVENTOR(S) : David William Cabell et al.

It is certified that error appears in the above-identified patent and that said Letters Patent is hereby corrected as shown below:

Cover page, under FOREIGN PATENT DOCUMENTS, please add --

| | | |
|---|---|---|
| 2 321 389 | 12/76 | France |
| GB 1,059,541 | 2/67 | United Kingdom |
| GB 2,055,689 A | 3/81 | United Kingdom |
| 2 113 236 A | 8/83 | Great Britain |
| 05070337-A | 3/93 | Japan |
| WO 87/03613 | 6/87 | PCT |
| WO 95/16824 | 6/95 | PCT |
| WO 96/14835 | 5/96 | PCT --. |

Cover page, under FOREIGN PATENT DOCUMENTS, please add --

OTHER DOCUMENTS

"Dow Corning Q2-5200 Formulation Aid", Dow Corning Corporation (1990) --.

Column 3, line 8, "wetlike" should read -- wet-like --.

Column 4, line 19, "watersoluble" should read -- water-soluble --.

Column 7, line 43, "ramic)" should read -- ramie) --.

Column 7, line 65, "wetlaying" should read -- wet-laying --.

Column 8, line 1, "wetlaying" should read -- wet-laying --.

Column 8, lines 21-22, "thermomechanical" should read -- thermo-mechanical --.

Column 11, line 44, "Coming," should read -- Corning, --.

Column 15, line 13, "watersoluble" should read -- water-soluble --.

UNITED STATES PATENT AND TRADEMARK OFFICE

CERTIFICATE OF CORRECTION

PATENT NO. : 5,908,707

DATED : June 1, 1999

INVENTOR(S) : David William Cabell et al.

It is certified that error appears in the above-identified patent and that said Letters Patent is hereby corrected as shown below:

Column 18, line 17, "-ethersulphonates" should read -- -ether-sulphonates --.

Column 19, line 27, after "thereof" insert -- . --.

Column 19, line 34, "2-ethoxyphenol," should read -- 2-ethoxy-phenol, --.

Column 19, line 38, "tertbutyl-" should read -- tert-butyl- --.

Column 25, line 67, delete "30".

Column 26, line 8, delete "35".

Column 31, line 27, "quatemized" should read -- quaternized --.

Signed and Sealed this

Twenty-ninth Day of February, 2000

*Attest:*

Q. TODD DICKINSON

*Attesting Officer*

*Commissioner of Patents and Trademarks*